United States Patent
Ghangam et al.

(10) Patent No.: US 10,539,932 B2
(45) Date of Patent: Jan. 21, 2020

(54) MACHINE DIAGNOSTICS BASED ON OVERALL SYSTEM ENERGY STATE

(71) Applicant: Intel Corporation, Santa Clara, CA (US)

(72) Inventors: Sangeeta J. Ghangam, Chandler, AZ (US); Roy L. Doyal, Albuquerque, NM (US); David I. Poisner, Carmichael, CA (US); Farzin Guilak, Beaverton, OR (US); Doye Chukwuyem Emelue, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 15/721,907

(22) Filed: Sep. 30, 2017

(65) Prior Publication Data

US 2019/0101876 A1 Apr. 4, 2019

(51) Int. Cl.
| *G05B 13/02* | (2006.01) |
| *G06F 1/20* | (2006.01) |
| *F16F 15/08* | (2006.01) |
| *F16F 1/36* | (2006.01) |
| *F24F 13/24* | (2006.01) |

(52) U.S. Cl.
CPC .. *G05B 13/021* (2013.01); *G05B 2219/49048* (2013.01)

(58) Field of Classification Search
CPC .......... G05D 23/1934; G10G 2210/121; F24F 13/24; F24F 2013/247
USPC .................................................. 700/275, 300
See application file for complete search history.

(56) References Cited

U.S. PATENT DOCUMENTS

| 2010/0324799 A1* | 12/2010 | Davison .................... F02C 9/00 |
| | | 701/100 |
| 2016/0334201 A1* | 11/2016 | Witkos ................. G01B 21/045 |
| 2016/0342181 A1* | 11/2016 | Peterson ................. G05B 15/02 |

* cited by examiner

*Primary Examiner* — Michael J Brown
(74) *Attorney, Agent, or Firm* — Compass IP Law PC

(57) ABSTRACT

An edge device monitors a mechanical system for changes in vibration state. When an overall vibration state of the mechanical system deviates by at least a threshold from an expected vibration state, the edge device can send the data to a server for diagnostic processing. The edge device can thus monitor for a pre-failure condition that suggests an upcoming failure or a need for service. With selective sending of sensor data, the bandwidth and processing associated with diagnostics can be reserved for situations more likely indicative of a condition needing diagnosing, rather than performing constant diagnostic processing.

12 Claims, 9 Drawing Sheets

US 10,539,932 B2

MACHINE DIAGNOSTICS BASED ON OVERALL SYSTEM ENERGY STATE

FIELD

The descriptions are generally related to mechanical system monitoring, and more particular descriptions are related to computing a vibration state based on sensor data, and performing selective actions based on the vibration state.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2017, Intel Corporation, All Rights Reserved.

BACKGROUND

Mechanical systems, such as those in which motors are used, are subject to failure due to deterioration of mechanical components. Even before failure, the construction of mechanical systems with rotating parts can produce a significant amount of acoustic noise that is undesirable from the experience of a person using the system. For example, air conditioning systems can provide a more comfortable environment, but can be noisy, such as in room level systems used in hotel rooms and residential bedrooms. As other example, refrigerators, freezers, and water pumps are among other mechanical systems that can generate significant noise during operation.

To reduce the operating noise, system designers have traditionally attempted to reduce the noise by reducing friction, improving the motor mounting, adding sound dampening material, optimizing fan shape, or generating anti-noise, or some combination. Each traditional approach has limits on being able to effectively reduce the operating noise.

In addition to attempting to design for operating noise, some of these traditional approaches have benefits in extending the life of the system. However, for important pieces of equipment, such as mechanical systems including motors used in manufacturing, the cost of a failure can be significant. Thus, the system can be monitored and regularly diagnosed for failure. Such monitoring is traditionally a heavily manual task, with operators at backend servers monitoring operational and usage data to attempt to determine if an aberration exists, and whether it may suggest an imminent failure. However, continual monitoring runs into problems of monitoring frequency, where monitoring too slowly can miss data that would indicate a failure, but monitoring too quickly results in a large amount of data that can be difficult or costly to transmit and store. Additionally, being a largely manual task, constant monitoring of data that does not usually indicate any operation outside of ordinary can "numb" an analyst to important data. Such manual analysis can result in either an excess of false alarms that trigger unnecessary servicing or offlining of equipment, or alarm fatigue resulting in missed diagnoses.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
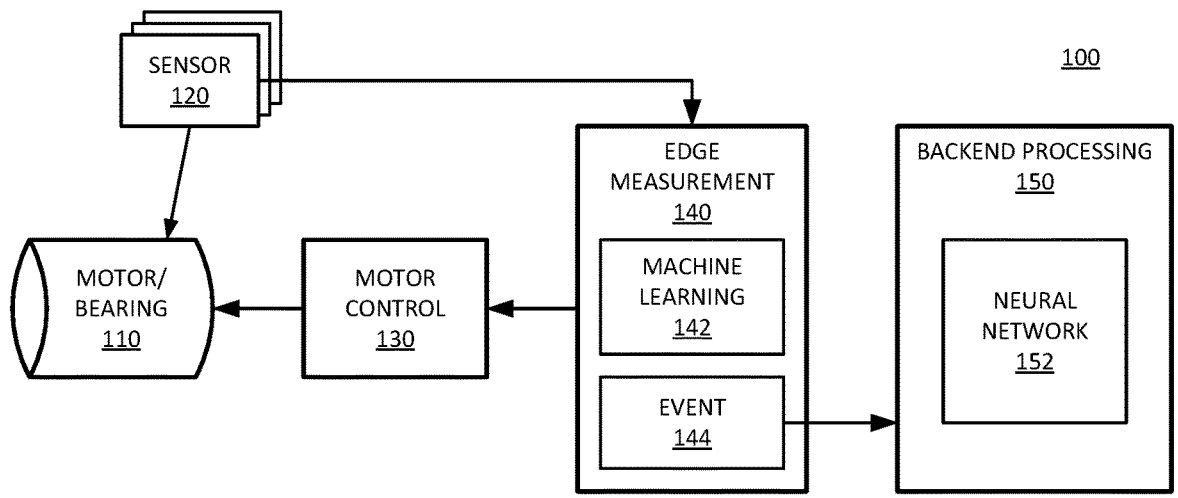
FIG. 1 is a block diagram of an embodiment of a system to monitor a mechanical device based on overall energy level of the device.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, an edge device monitors a mechanical system for changes in vibration state. The edge device can perform automated monitoring of data for deviation of an overall vibration state from an expected vibration state of the mechanical system. The vibration state refers to an amount of energy of a mechanical system or mechanical device is system noise or energy loss. The goal of energy input to a mechanical device/system is to perform useful work, but the system dissipates some of the energy as noise, heat, or other loss, or a combination. The overall vibration state can refer to the sum of energy that is not performing useful work in the system. Some loss is inevitable. Changes in the amount of energy loss can be indicative of potential future failure in one or more components. Overall vibration state refers to a state of energy in the system that can be measured by sensors. In one embodiment, an edge device detects overall vibration energy and performs operations based on the vibration state detected, and learned over time. Vibration state could alternatively be referred to as vibration energy, vibration mode (referring to a mode of operation, for example, if vibration energy can be classified by ranges of energy). For example, a change in vibration state of equipment being monitored can result from subtle changes in the frequency spectrum of vibration energy in the monitored signal. Such changes can be due to a potential fault, or just change of operating parameters such as speed or loading. In one embodiment, an edge monitoring system detects such changes and generates a new vibration mode (which can be a neuron or cluster of a machine learning system) to be stored and processed by the system.

In one embodiment, the edge device provides alert data only when a deviation is detected, making better use of analyst time and expertise. When an overall vibration state of the mechanical system deviates by at least a threshold from an expected vibration state, the edge device can send the data to a server for diagnostic processing. In one embodiment, the edge device also periodically sends data for collection and analysis at the backend, but on a much slower basis. For example, the edge device may monitor the system once every few seconds, and provide data to the backend either when a vibration state change is detected, or on a schedule of approximately every hour. In such a way, the monitoring can continue while reducing the data fatigue of the analysts, and without requiring computational heavy operations on a continual basis. In one embodiment, the edge device can monitor for a pre-failure condition that suggests an upcoming failure or a need for service. In one embodiment, the edge device can monitor for noise reduction by adjusting settings that cause operation in a lower range with quieter output. With selective sending of sensor data, the bandwidth and processing associated with diagnostics can be reserved for situations more likely indicative of a condition needing diagnosing, rather than performing constant diagnostic processing.

Consider a mechanical system with a motor or a bearing or other rotational element or a combination. The motor can drive an axle to produce a desired output of the system. The bearing element can be or include a rolling-element bearing such as a roller bearing or a ball bearing. The rotational element can include any component that rotates, such as a gear or stator, as well as other motors or rolling element. By monitoring the vibration state of the system, an edge monitoring device can detect variations in operation of the system. Some variations in operation can be expected, such as on/off states, or different operating states such as higher and lower speed operation. Within such operating states, the edge device can generate an expected pattern, or can be trained with expected vibration states for the operating states. Variations within operation in an operating state may either be controllable for noise reduction, or may indicate a need for service, or a combination. It will be understood that monitoring as described can be used in addition to any type of mechanical system design that will reduce the noise, such as is described above. In one embodiment, the monitoring as described herein can find quieter operating points and can adapt as the system changes over time.

In one embodiment, by monitoring the changes in the mechanical system operation over time, the edge device can identify data that can be useful in predicting failure or needs for servicing. With modern sensors, there is a significant amount of data that can be gathered to provide indicators for failure or mechanical breakdown. However, while the data from one or multiple sensors can indicate failure, processing the data to identify failure while fitting within sampling requirements to detect failure would traditionally be impractical. The edge device described herein can identify what data is relevant and what data is less probative for failure analysis. The edge device monitoring overall vibration states of the mechanical system can use the vibration states as an overall measure of system operation. The data from the one or more sensors can thus be used to identify an overall vibration state and a change in vibration states relative to either past operation or expected operation, or a combination, which can more accurately reflect a situation where motor setting changes would decrease noise, or where motor servicing may reduce the risk of failure. The servicing of a mechanical system can be planned, and the intentional offlining can be much less disruptive and less costly for a company than if the system goes down due to failure.

FIG. 1 is a block diagram of an embodiment of a system to monitor a mechanical device based on overall energy level of the device. System 100 represents monitoring components and a device to be monitored. More specifically, motor/motor 110 represents a device or system that includes a rotational component or bearing component or other component that functions in under radial stress. Over time, motor 110 will operate differently than at its beginning of life operation. Motor 110 can include a mechanical system or device with an axle and motor, or an axle and a bearing.

Sensor 120 represents one or more sensors that make measurements about one or more environmental conditions of motor 110 while operational. Sensors refer to hardware devices that include circuits capable of making measurements of a condition. In one embodiment, sensor 120 includes multiple of the same kind of sensor positioned at different locations around motor 110. In one embodiment, sensor 120 includes multiple different types of sensors that measures different environmental conditions, such as accelerometers, acoustic sensors, heat or temperature sensors, sensors that detect movement variation, or other sensors, or a combination. Different sensors 120 can have different periods of measurement. In one embodiment, one or more sensors 120 makes measurements with a frequency in the range of every few minutes, while one or more other sensors 120 makes measurements in the range of tens of minutes or hours. In one embodiment, one or more sensors 120 makes measurements in a range of multiple times per minute. In one embodiment, sensor 120 includes one or more sensors that gather and store data to send as a burst. In one embodiment, sensor 120 includes one or more sensors that makes measurements and averages or accumulates the results prior to sending the data.

Sensor 120 can provide raw sensor data to edge measurement device 140. Edge measurement 140 represents a hardware device that can gather the sensor data and perform computations on the data. The computations by edge measurement 140 can be realtime computations performed at a location local to motor 110 and sensor 120. A local computing device refers to a device that is on a same side of a network connection as the sensor, and for example, does not have to send the data over the Internet or another network with substantial relative delay. An example of hardware and services of edge measurement 140 can be found in FIGS. 3A and 3B, described below.

In one embodiment, edge measurement 140 processes raw sensor data from sensor 120, and determines if there is an event that would indicate the data should be sent for further analysis by backend processing 150. Such analysis can be referred to as diagnostic processing or diagnostic analysis. In one embodiment, edge measurement 140 performs computations on sensor data to determine if the sensor data indicates a change in a vibration state of motor 110. In one embodiment, the change in vibration state is or indicates a change in a vibration level of motor 110. As mechanical parts wear, especially those involved in mechanical systems that include rotation parts, they have a tendency to vibrate. In one embodiment, sensor 120 includes one or more sensors that measures an amount of energy in one environmental condition that could be an indication that a vibration level of motor 110 has changed over time, or has reached a threshold level such that set by training. The computation and comparison of vibration state over time will include storing of historical information. In one embodiment, edge measurement 140 does not necessarily store historical data for comparison as a reference or baseline, but rather compares current measurements against a trained reference point or baseline or known good condition. In one embodiment, edge measurement 140 includes parameters that set a bound on known good conditions, and edge measurement 140 generates event 144 when current measurements are outside the parameters. In one embodiment, edge measurement 140 includes machine learning capability 142, which enables the edge monitoring to learn behaviors of the system over time. In one embodiment, machine learning 142 detects event 144 by determining that there is a difference in the vibration energy of motor 110.

In one embodiment, event 144 represents a deviation of more than a threshold amount from a known good state or from a historical state. The threshold amount of deviation can be a configured or programmed amount determined by training to indicate that further analysis would be beneficial. Thus, when edge measurement 140 detects a deviation in a vibration state based on sensor data, event 144 can be triggered to send the sensor data to backend processing 150. The deviation can be a computed standard deviation (e.g., a "sigma change") or other deviation threshold. In one embodiment, edge measurement 140 sends sensor data to backend processing 150 only in response to event 144, whether an event to indicate a threshold vibration state or vibration state change, or whether an event to indicate an amount of time has passed without an event and the data should be send anyway.

Backend processing 150 includes a server that can perform computations on the data. A human operator can perform at least some analysis on the data at backend processing 150. In one embodiment, backend processing 150 includes neural network 152, which represents an analytics processing network. While illustrated as a neural network, neural network 152 will be understood as an example of a machine learning system. Other machine learning systems can be used with or in place of neural network 152. Neural network 152 represents a dynamic processing system that improves in accuracy as more data is gathered and processed. In one embodiment, edge measurement 140 includes a neural network, which may be simpler and require less processing than neural network 152 of backend processing 150. Backend processing 150 may or may not be on the same side of the network connection as sensor 120 and edge measurement 140. Thus, in one embodiment, backend processing 150 is remote from sensor 120, and edge measurement 140 processes the sensor data and sends the processed data over a network connection to backend processing 150 for analysis.

It will be understood that traditional measurement and monitoring with sensor 120 can generate more raw sensor data than can be processed by system 100. With system 100, sensor 120 can be said to process raw sensor data to determine a vibration state or a vibration level of motor 110. Thus, one or more sensors 120 can measure energy levels that are consistent with higher or lower vibration or higher or lower vibration states, and provide the data to edge measurement 140 for processing. Rather than directly measuring a vibration or an overall vibration state, edge processing 140 can determine such a vibration level or vibration state of motor 110 from the sensor data. The processing by edge measurement 140 can filter the sensor data to pass only data considered interesting to backend processing 150. The processing by edge measurement 140 can indicate when motor 110 or a component of the mechanical system such as a fan, motor, belt, or other component is likely to fail. Typically, failure results in a higher vibration state, but this may not be the case with all systems and all sensors 120. Thus, in one embodiment, edge measurement 140 monitors for increases in vibration or energy from motor 110. In one embodiment, edge measurement 140 monitors for a decrease in overall energy level of the mechanical system.

In one embodiment, in addition to triggering event 144 in response to a change in overall vibration state, edge measurement 140 can trigger event 144 in response to a schedule. For example, consider a system where an overall increase in vibration state would indicate a possible condition that will result in an impending failure. The edge measurement can trigger an event to report the data to the backend when it detects a threshold vibration state or threshold vibration state increase based on sensor data. In that example, consider also that the system may go long periods of time (e.g., days, weeks, or months) without having any overall vibration state changes. With no information, backend processing 150 may be unable to determine if no data is received because of a lack of failure or because of a failure. Thus, in one embodiment, edge measurement 140 triggers event 144 periodically (e.g., every 8 hours, every day, or some other schedule) to report measurement data to backend processing 150. Such data will indicate a normal status, but can provide an important "heartbeat" function for system 100.

In one embodiment, system 100 includes motor control 130, which can vary one or more parameters of operation of motor 110. For example, motor control 130 can vary a rotational speed of a motor associated with motor 110. In one embodiment, edge management 140 controls a variable speed control mechanism of motor control 130 in response to processing of sensor data. In one embodiment, edge measurement 140 triggers a change in motor settings in response to event 144. In one embodiment, edge measurement 140 triggers a change in settings in response to data indicated by processing of sensor data that does not rise to a level to trigger event 144. In one embodiment, motor control 130 can set a parameter of operation to adjust a speed of a motor, to adjust to a speed that reduces vibrations and acoustic noise. In general motors produce less noise when operated at lower speeds. However, lower speed operation does not always result in less noise. For example, noise can spike at specific frequencies due to resonances, constructive interference, or other conditions. In one embodiment, motor control 130 opportunistically adjusts the speed to a point above the slowest permitted speed that results in a lower noise level.

It will be understood that system 100 can respond to pre-failure conditions of motor/motor 110. For example, a system may be able to detect when the mechanical system goes offline or shuts down due to a failure. However, the point of failure is already later than would be preferred to take action, seeing that it results in unplanned downtime that can cost money and cause inconvenience. Rather, a pre-failure condition as detected by edge measurement 140 can indicate that a failure is statistically likely prior to its occurrence. Diagnostic processing by backend processing 150 can indicate that service or maintenance should be performed on the mechanical system to avoid failure. Thus, the cost and downtime can be minimized.

In one embodiment, backend processing 150 provides feedback to computation resources of edge measurement 140, which can improve the accuracy of edge measurement 140. For example, if edge measurement 140 detects an aberration in a vibration state, triggers event 144, and sends the sensor data to backend processing 150, it may send the data in a similar situation in the future. However, if something about the aberration is determined at backend processing 150 to not indicate an imminent failure or a need to adjust a motor setting, in one embodiment, backend processing 150 can provide such feedback to edge measurement 140, which can learn to not trigger event 144 for similar conditions in the future. Thus, edge measurement 140 can learn from feedback by backend processing 150 which sensor data should result in events 144.

Figure 2:
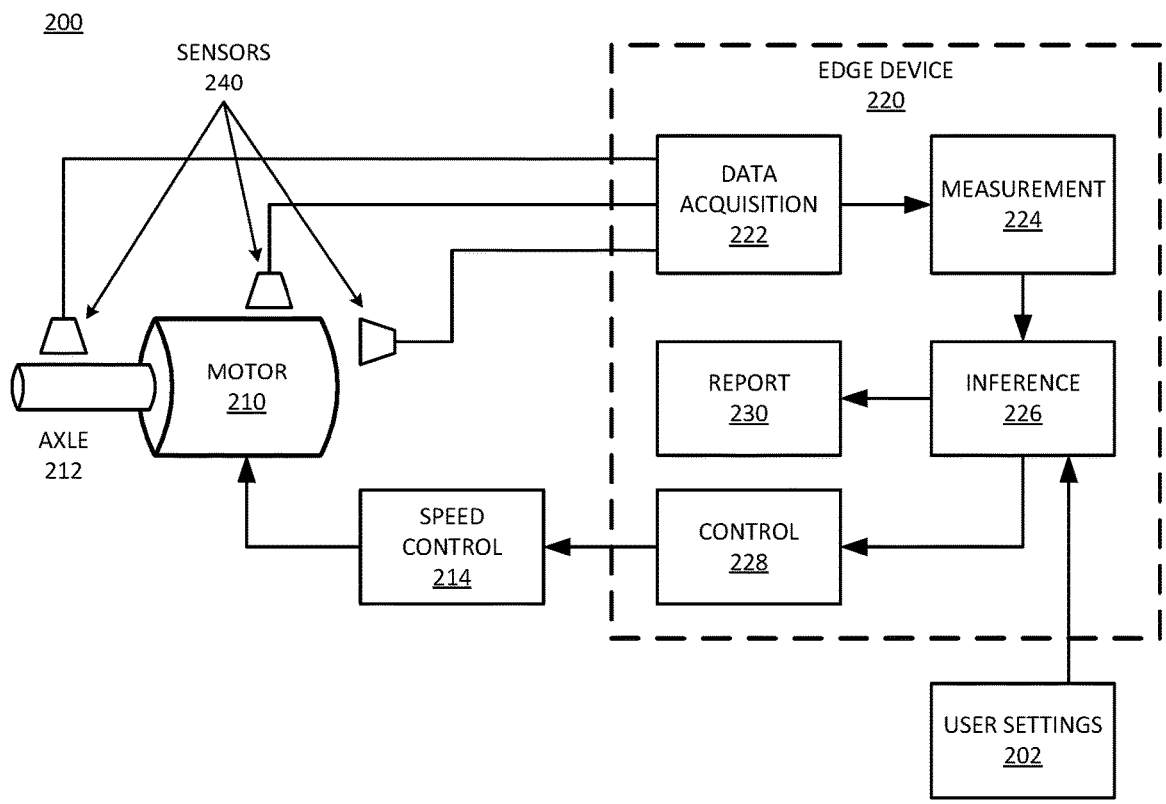
FIG. 2 is a block diagram of an embodiment of edge monitoring for a motor.

FIG. 2 is a block diagram of an embodiment of edge monitoring for a motor. System 200 provides one example of a system in accordance with system 100 of FIG. 1. In one embodiment, system 200 includes motor 210, which is a monitored mechanical system. Motor 210 can represent one or more motors in a monitored mechanical system. Motor 210 drives axle 212, which can provide work in accordance with any type of mechanical system mentioned above, or countless other systems. Speed control 214 represents control logic to set the speed of motor 210, which determines how fast axle 212 rotates relative to motor 210. It will be understood that certain motor designs spin the motor with a fixed axle, and other motor designs spin the axle with a fixed motor. In either case, speed control 214 can set the rotational speed. Sensors 240 monitor vibration state of motor 210 or the combination of motor 210 and axle 212.

In one embodiment, sensors 240 are or include an accelerometer to measure the vibrations produced by the operation of motor 210. In one embodiment, sensors 240 are or include a microphone to measure the acoustic noise produced by motor 210. While accelerometers and microphones are specifically referenced, it will be understood that other types of sensors could be included in addition to, or alternatively to accelerometers or microphones. In one embodiment, system 200 includes multiple types of sensor. In one embodiment, sensors 240 are or include a tachometer to measure the rotation rate of motor 210. In one embodiment, system 200 includes multiple different types of sensors, which can be or include sensors configured to monitor motor heat, axle motion, motor acoustics, or a combination. In one embodiment, sensors 240 measure a condition of a rolling bearing that supports an axial load during rotation of axle 212. Axle 212 can be part of motor 210, or coupled to motor 210 with a bearing. In one embodiment where an axle is spinning, the sensor can be on outboard bearings of the motor itself instead of the axle.

Sensors 240 generate sensor data that indicates conditions of motor 210 or axle 212 or both. Edge device 220 monitors motor 210 through the data measured by sensors 240. Edge device 220 represents one or more hardware components that gathers and processes sensor data. System 200 illustrates services provided by edge device 220. The services can be provided by a single hardware component, or a collection of hardware components. In one embodiment, edge device 220 represents a server device. Edge device 220 includes at least one computational hardware component, such as a processor, to run processes for one or more of the following services. The computational hardware can be or include the logic referred to below.

Edge device 220 includes logic for data acquisition 222. The logic can include appropriate hardware elements and software processes. Data acquisition 222 enables edge device 220 to obtain measurements from sensors 240. Edge device 220 includes hardware interface elements to interconnect with sensors 240, such as a frontend interface circuit. It will be understood that when system 200 includes multiple different sensor types, edge device 220 would include appropriate interface hardware for each different sensor type for data acquisition 222. The interface hardware can include voltage inputs, current inputs, and appropriate signal lines and input/output circuits.

Edge device 220 includes logic for measurement 224. The logic can include appropriate hardware elements and software processes. Measurement 224 enables edge device 220 to convert raw sensor data or measurement data to usable values. Usable values are values that can be represented in a form that enables digital processing. The measured data may need to be amplifier, filtered, normalized, or a combination to provide usable values. Measurement 224 enables edge device 220 to record the values for processing. Edge device 220 executes measurement computations with the computational component.

Edge device 220 includes logic for inference 226. The logic can include appropriate hardware elements and software processes. In one embodiment, inference 226 enables edge device 220 to determine from the sensor data if a particular speed of motor 210 can reduce measured noise, or whether measured noise is at a minimum for the desired operational output range of motor 210. Based on the determination, edge device 220 can implement control 228 to trigger an adjustment of motor speed via speed control 214. In one embodiment, speed control 214 includes a control circuit that adjusts the settings of motor 210 for different speed of operation. In one embodiment, user settings 202 provide input from a user to set parameters for the comparison determination. For example, user settings 202 can provide ranges or bounds for the operation of motor 210. For example, a user may set motor 210 to operate at "high" speed, and edge device 220 can have a range of acceptable speeds that are within the range of "high speed" operation. In one embodiment, within that range, inference 226 can compute a speed to keep a noise level to a minimum. In such an implementation, a change from a threshold energy level can refer to data that indicates more noise than a previous setting of motor 210.

In one embodiment, inference 226 enables edge device 220 to determine if it should report out the sensor data for further diagnostic analysis. For example, if sensor data indicates a change from a threshold energy level or a baseline value, edge device 210 can report the data to a backend server (not specifically shown). Report 230 represents the reporting service that will take stored data and send it over a network to a remote, backend processing system. In one embodiment, inference 226 can determine to report the data in response to a period of time, regardless of whether a change or deviation from a baseline energy level or vibration state is detected. In one embodiment, edge device 220 can send data in response to detection of a threshold vibration state, a deviation from a baseline vibration state, or a time period, or a combination. In one embodiment, edge device 220 can send data via report 230 or generate a setting control via control 228, or a combination.

System 200 includes motor 200 to represent a mechanical system to be monitored, sensors 240 to generate data to be computed for monitoring operations, and edge device 220 to perform local computation on the sensor data to determine when to perform an action based on a change in overall vibration state of the mechanical system. In one embodiment, edge device 220 provides an overall vibration state computation and a fault diagnostic computation. The overall vibration state computation determines a state of motor 210 from sensor data. The fault diagnostic determines whether the determined state indicates that control action should be taken, or whether data should be reported for more in-depth analysis, or a combination.

In one embodiment, the overall vibration state is an overall vibration determination. In one embodiment, the overall vibration energy level is a numeric value representing the energy in the input sensor signals as computed from the input sensor signal using a Fast Fourier Transform (FFT) or other digital signal processing algorithm. In one embodiment, inference 226 can evaluate the overall vibration state as 'normal', 'below-normal', or 'above-normal'. It will be understood that more variations can be used. More levels or classes of vibration state may require additional processing.

It will be understood that edge device 220 performs the fault diagnostic locally to the monitored mechanical system, as contrasted with sending all data for analysis over a network. The local processing may be less detailed than a full analysis that can be performed by a backend server, but provides sufficient intelligence at the monitoring point to reduce the amount of data needing to be sent for deep analysis. Thus, edge device 220 can reduce the amount of data send to a backend server, which saves bandwidth, computing power, energy, time, and costs. Edge device 220 can be considered to send data to a backend server only when the data is data of interest or data with a higher likelihood of fault indication. In one embodiment, edge device 220 ignores the data or dumps the data locally without having to send the data over a network to the analytics backend.

In one embodiment, the local fault diagnostic refers to generation of a machine diagnostic (MD) code associated with the state of monitored equipment. The MD code can be computed based on input sensor data, such as, but not limited to: raw accelerometer data, rotation per minute (RPM) of the equipment or mechanical system, sensor positioning, vibration phase data, or other data, or a combination. Sensor positioning can be relevant in a system with multiple sensors, where different weights can be provided to input data based on a position of a specific sensor. Phase data can also be relevant in a system with multiple sensors, where differences in input of different sensors in time can provide information related to the vibration state and operation of the mechanical system.

While referred to as fault diagnosis, it will be understood that in one embodiment, the computation of vibration state and fault diagnosis can be utilized by control 228 to fine tune a rotation rate for motor 210, without using a result of the overall vibration state. Thus, local fault diagnostics can refer to detection of a fault condition or the detection of an optimized rotation rate.

Edge device 220 can diagnose machine failure or optimize motor operation based on the overall vibration state. In one embodiment, edge device 220 provides a specific diagnosis or an MD code is only if fault frequencies in data computations match with expected occurrences for a given type of potential failure, and the overall vibration state is more than a threshold level different than an expected baseline. For example, consider that edge device 220 performs FFT computations on received sensor data, and uses vibration state levels to classify operation. In such an example, if a corresponding FFT for a given data point matches up with expected occurrences for a given type of potential failure, and an overall vibration level for engine 210 is at or above a designated 'warning' level (e.g., as determined by standard sigma values at 0.5 increments), edge device 220 can generate an MD code.

Continuing with the example, in one embodiment, edge device 220 will not report the detected potential fault unless both conditions are true, even if one of the conditions is true. The truth of one condition may have traditionally been considered to indicate a fault, which can frequently trigger false alarms, and increase alarm fatigue. Computation by edge device 220 can identify situations in which overall vibration state has increased, which is usually symptomatic with impending machine failure. The edge analysis can improve diagnostic accuracy, which is expected to reduce alarm fatigue. Edge device 220 can be expected to not recommend a diagnostic outcome without a data point that has a high statistical likelihood of being an actual alarm.

For setting a rotation rate, consider an implementation where motor 210 is turned on and off frequently (e.g., many times per day). In one embodiment, edge device 220 only executes measurement process 224 when the mechanical systems is started. Measurement can continue until the speed of motor 210 reaches the maximum speed for the designated range. In one embodiment, comparison process 226 can check to see at which speed the motor yielded the lowest noise within the specific speed range.

For example, if the user set the speed to "medium" (e.g., fan speed 180-200 RPM for a certain example), inference 226 can check for the least noise when the motor is ramping from 180 to 200 RPM, or other range that qualifies as "medium". In one embodiment, control circuit 228 sets the speed to the rate at which the minimum noise was generated. For systems where motor 210 is run continuously, edge device 220 may execute inference 226 at designated intervals, such as once per 8 hours. In one embodiment, edge device 220 can measure the acoustic noise while varying the motor speed from the minimum to the maximum permitted speed within the designated range, and then setting the speed that results in the minimum acoustic noise.

Figure 3A:
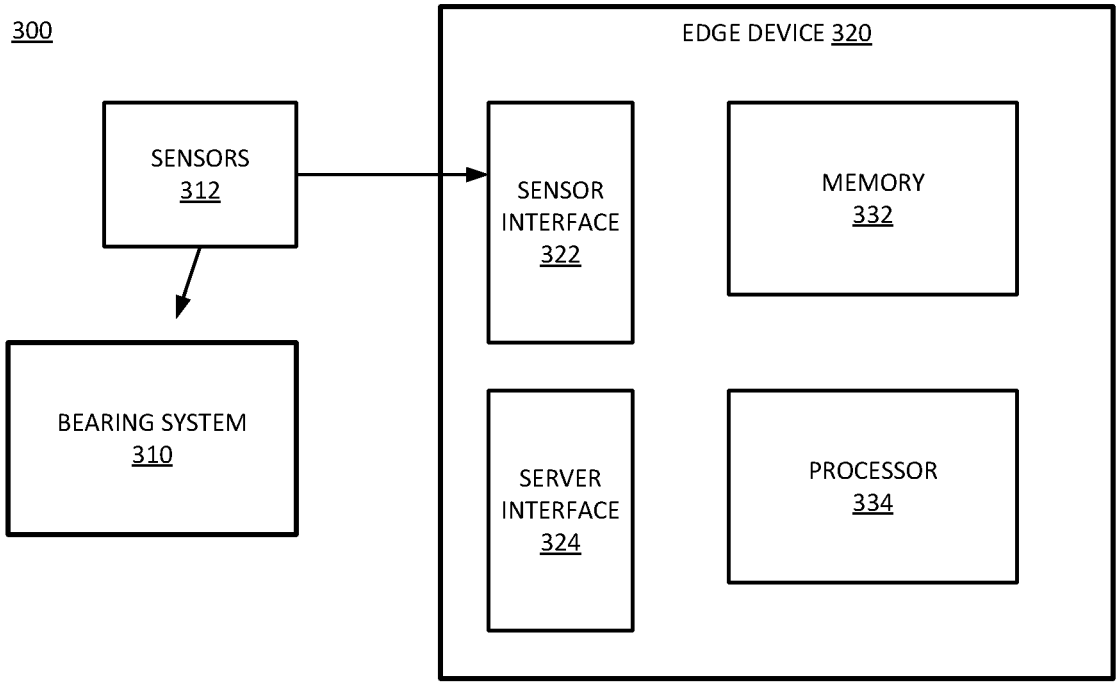
FIG. 3A is a block diagram of an embodiment of a mechanical system with an edge device to monitor the system through processing sensor input.

FIG. 3A is a block diagram of an embodiment of a mechanical system with an edge device to monitor the system through processing sensor input. System 300 provides one example of a system in accordance with system 200 of FIG. 1 or system 100 of FIG. 1. System 300 includes bearing system 310, sensors 312, and edge device 320. Bearing system 310 represents a monitored mechanical system with a bearing or a component to interface a rotational component with a component that is driven by the rotational component or that drives the rotational component. Sensors 312 represent one or more sensors that make measurements to monitor bearing system 310. Edge device 320 represents an edge processing device or system in accordance with any embodiment described herein.

Edge device 320 includes sensor interface 322 to couple to sensors 312. Sensor interface 322 includes hardware circuitry to couple to sensors 312 and receive data from the sensors. In one embodiment where system 300 includes multiple sensors, one or more sensors can be included per input channel to sensor interface 322. An input channel can refer to a signal line or an interface or other distinct interconnection between a sensor and edge device 320. In one embodiment, a channel represents a signal pathway for sensor data. As an example, consider that system 300 includes 8 different sensors or 8 different sensor types; in such an implementation, sensor interface 322 can include 8 channels for sensor input.

Edge device 320 includes memory 332 to store input data for processing. Memory 332 can represent any type of storage medium to hold input data, such as volatile memory, nonvolatile memory, registers, or buffers, or other addressable storage location, or a combination. Memory 332 represents storage for input sensor data, and does not necessarily represent all memory for edge device 320. Edge device 320 includes memory to store code and data for execution of operations. The input sensor data is not necessarily stored in the same memory or the same location as operational data and code for execution of the processes of edge device 320.

Edge device 320 includes processor 334 to execute the processes and functions of edge device 310, such as the computation of vibration states, comparison of a measured vibration state or measured data point and a reference, and evaluation or determination if a measured vibration state should trigger sending data to a backend. Processor 334 can be or include one or more processor devices, such as a controller or microcontroller, a logic array, a programmable processor device, or other component. Processor 334 computes a vibration state of bearing system 310 based on the sensor data. The vibration state can be referred to as an environmental vibration state, referring to the energy put into the environment surrounding bearing system 310. The environmental vibration state can be distinguished from what might otherwise be considered a vibration state of a motor or mechanical system, which may be able to drive at different rates, or respond to different voltages or currents, or a combination. Rather than referring to an amount of energy entering into the mechanical system, or an amount of energy output as work by the mechanical system, sensors 312 measure environmental conditions resulting from energy transferred to the surroundings by bearing system 310 when it operates. Such energy can be referred to as the energy lost during operation.

In one embodiment, edge device 320 includes server interface 324 to couple over a network to a backend server. The server can be a "server farm" or cloud server or other collection of hardware resources to perform computing. The backend server can provide analytics of sensor data points captured and flagged by edge device 320. A data point can be flagged by generating a diagnostic code, or simply by sending the data for analysis. The analysis by the backend can be more extensive than the vibration state analysis by the edge device. Thus, edge device 320 can perform realtime analysis for outlier data, and the backend server can analyze the data with a machine learning system to determine whether to service the mechanical system.

Figure 3B:
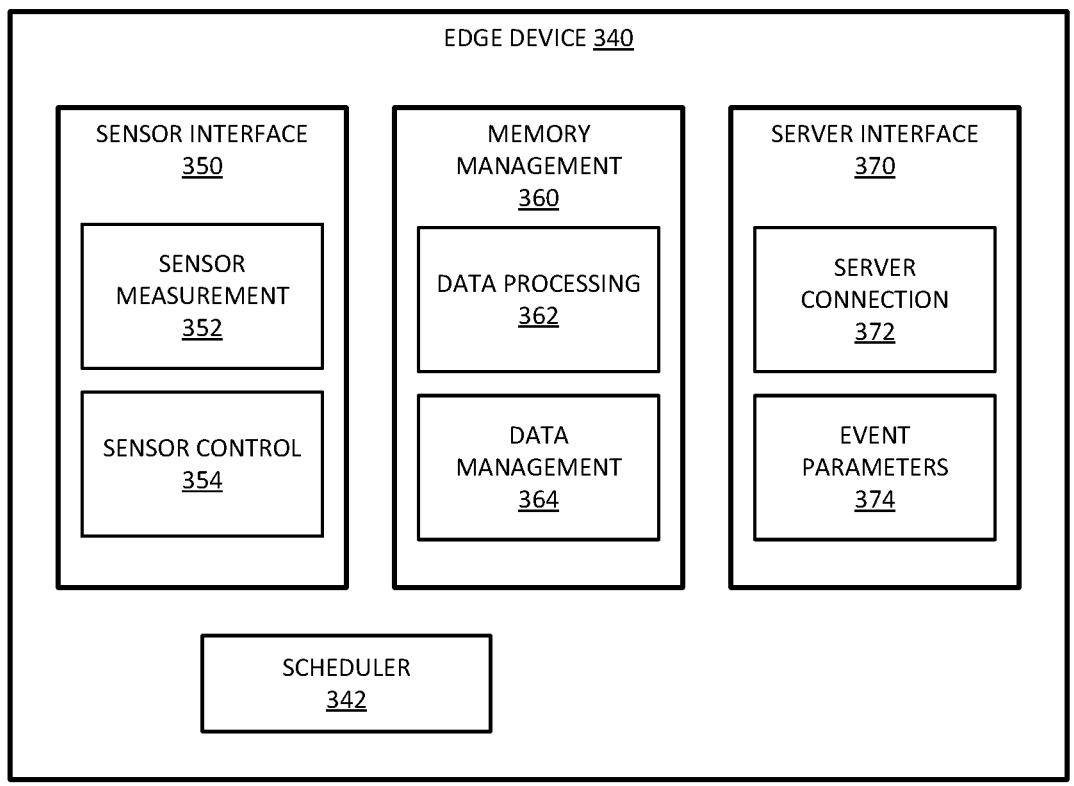
FIG. 3B is a block diagram of an embodiment of an edge device to monitor a mechanical system.

FIG. 3B is a block diagram of an embodiment of an edge device to monitor a mechanical system. Edge device 340 represents an edge device or edge processing component in accordance with any embodiment described herein. Edge device 320 of FIG. 3A more specifically identifies the hardware components of the edge device, and edge device 340 of FIG. 3B focuses more on the services provided by the edge device. Any service provided can be considered tied with the structural components that provide the service.

In one embodiment, edge device 340 includes sensor interface 350. The interface to the sensors occurs through circuitry to receive input signals, in one embodiment can include signal lines to carry commands or controls to the sensor in addition to signal lines for receiving input. Sensor interface 350 includes sensor measurement 352 to receive the sensor inputs. In one embodiment, edge device 340 processes the signals for amplitude and noise prior to digital processing the contents of the signals. Thus, sensor interface 350 can process the form of the signal as well as the data provided in the signal. In one embodiment, sensor interface 350 includes sensor control 354 to send control signals to the sensors. Sensor control 354 can enable sensor interface 350 to control timing of sampling and signaling, input type, power state of the sensor device (e.g., waking the device from sleep to perform measurements and then returning to a lower power state), or other control, or a combination.

Edge device 340 includes memory management 360, which represents logic to control storing data in memory and accessing the data back from memory. In one embodiment, memory management 360 can be considered to have data processing 362, referring to the processing of the sensor data stored in the memory. Data processing 362 represents any of the type of processing on the sensor data that is referred to herein, which enables edge device 340 to process and evaluate a vibration state of a monitored system based on the sensor inputs. Data management 364 of memory management 360 represents logic to determine how to store data, how long to store data, when to dump or evict data, what data to send to a backend server for processing, or other functions related to determining what data gets stored for how long, or a combination. In one embodiment, edge device 340 stores sensor data, processes it to look for either noise minimums or to monitor deviations of vibration state, or both, and then discards data that is not to be sent to the backend for additional diagnostics. In one embodiment, edge device 340 stores historical data trends to determine how operation of a mechanical system has changed over time. In one embodiment, edge device 340 averages data over a period of time (e.g., hours or days) to provide to the backend to indicate health of the mechanical system if no significant deviations of vibration state are detected.

Edge device 340 includes server interface 370, which represents logic to interface with a backend server for diagnostics and long-term storage. The interface to the server occurs through network interface circuitry that can send and potentially receive data from the server. Server interface 370 includes server connection 372, which can represent a network interface stack or drivers or a combination to manage a network link. In one embodiment, server interface 370 includes event parameters 374 to indicate when the edge processing detects a reporting event. As described herein, in one embodiment, in response to a vibration state that deviates by a preset amount from an expected state, edge device 340 can send data to a backend for diagnostics. Such detection can be considered to trigger an event. Event parameters 374 represent conditions for which a "deviation event" or "reporting event" triggers, to cause edge device 340 to report the data to the backend server.

Scheduler 342 can represent different logic within edge device 340 to manage operations based on timing. In one embodiment, scheduler 342 can manage the data measurement of the sensors. For example, scheduler 342 can represent a timing manager for obtaining data from sensors. Management of the timing can control either the timing of measurement by the sensors or sampling of the sensor data by edge device 340, or both. In one embodiment, scheduler 342 can manage the timing of sending data to a backend server. For example, in one embodiment, edge device 340 sends data periodically to the backend for recording and processing. Periodic updating of sensor data to the backend can be in addition to reporting events when sensor data deviates from expected levels.

Edge device 340 enables machine management and machine learning local to sensors of a monitored device.

Traditionally the diagnosing of impending equipment failures has been largely a manual task. Edge device 340 can apply digital signal processing (such as FFTs), machine profiles, and operating conditions. Rather than sending all sensor data for computation of all variables with significant amounts of sensor data, edge device 340 can essentially filter the data to send to the backend for processing. For example, edge device 340 can perform and monitor a manageable amount of processing locally, and then send all data to the backed when deviations occur. That way, the backend server does not have to perform computationally-intensive processing on all sensor data all the time, but can be limited to processing only data flagged by the edge device as being more likely to have data that needs to be reviewed. The data processed by edge device 340 is thus pre-failure data, and even when an event is flagged to send data for diagnostic processing, it does not necessarily mean that an error has been found or will be found. In one embodiment, such an evaluation remains with the backend processing, but the amount of data needed to be processed to monitor for anomalies can be significantly reduced.

Figure 4:
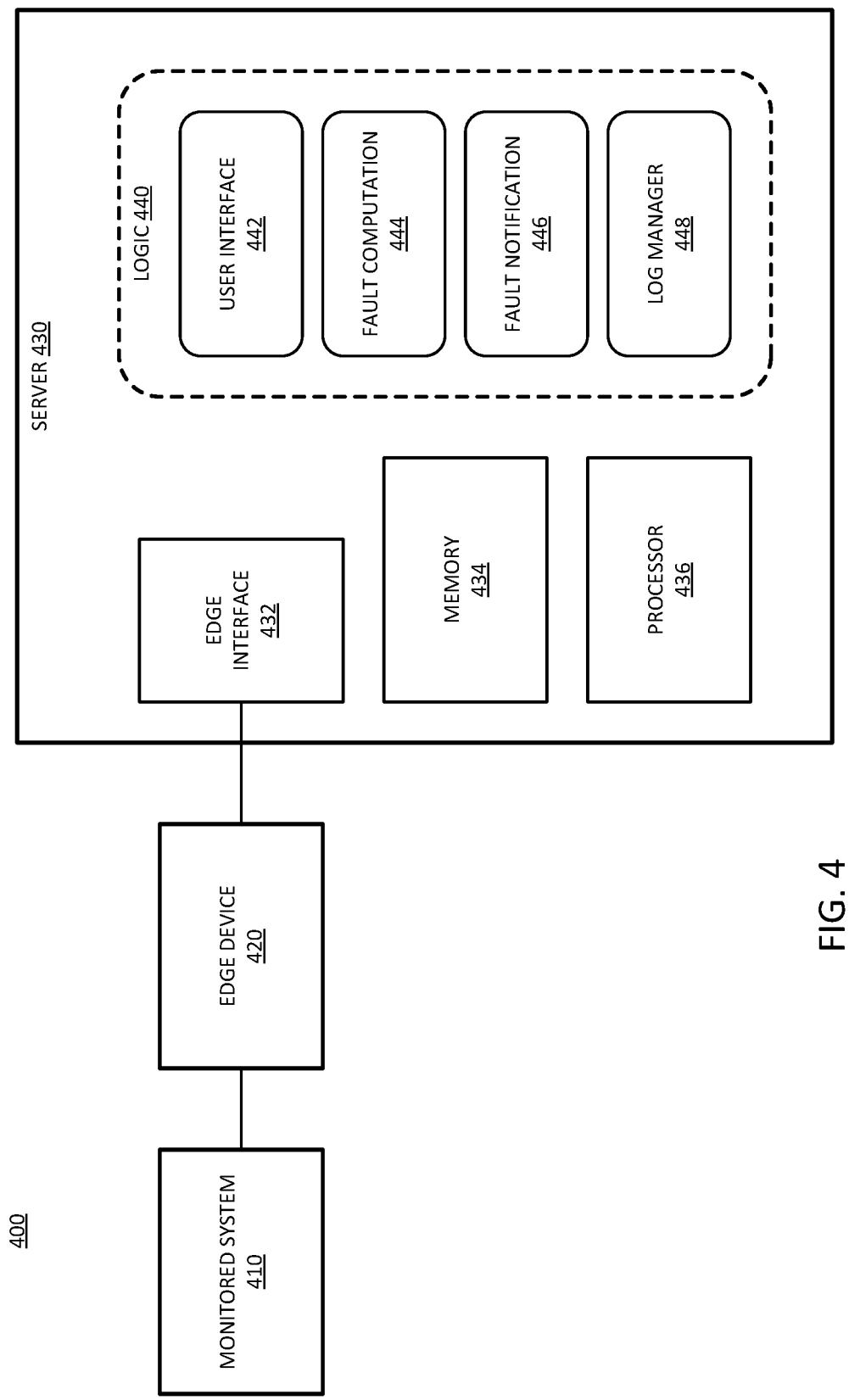
FIG. 4 is an embodiment of a system with a backend server to process selected mechanical system monitoring data.

FIG. 4 is an embodiment of a system with a backend server to process selected mechanical system monitoring data. System 400 represents a system in accordance with system 100 of FIG. 1. Monitored system 410 represents a system to be monitored with edge processing in accordance with any embodiment described herein. Edge device 420 represents an edge processing device in accordance with any embodiment described herein. Server 430 represents a backend server in accordance with any embodiment described herein.

Server 430 includes edge interface 432, which represents circuitry and process logic to interconnect with edge device 420. In one embodiment, edge device 420 is one of multiple clients of server 430 that connect to server 430 over a network interface.

Server 430 represents one or more computing resources, such as a standalone server, or a cloud-based server that executes an environment on shared hardware resources. Server 430 includes memory 434 and processor 436 as hardware resources. Processor 436 can be or include any type of processing device, whether dedicated or shared, multi-core or single core. Memory 434 represents storage resources for server 430 to receive and utilize data from edge device 420.

Logic 440 represents the services of server 430, which can be executed by processor 436 and memory 434, or other hardware (not explicitly shown), or a combination. In one embodiment, logic 440 includes user interface 442 to interact with a human analyst. Server 430 can provide further processing on data received from edge device 420, which may already have been processed, and present it to a human user for analysis. In one embodiment, logic 440 includes fault computation 444, which represents logic to compute whether sensor data indicates a fault condition or a likely fault condition for monitored system 410.

In one embodiment, logic 440 includes fault notification 446, which represents logic to generate an action in response to a determination of an impending fault for monitored system 410. In one embodiment, fault notification 446 can trigger a recommendation for a human user through user interface 442. Such a recommendation can indicate an action that should be considered, such as to perform a service maintenance on the system, or take the system offline. In one embodiment, fault notification 446 provides the fault recommendation to a remote user.

In one embodiment, logic 440 includes log manager 448 to enable server 430 to manage the data received from edge device 420. Log manager 448 can execute a policy that indicates what data should be kept and for how long. Historical data can be useful in building a machine learning system and computing trends for the vibration state or vibration of monitored system 410. However, such data may be aggregated and some data deleted in accordance with a policy after a certain amount of time.

Figure 5A:
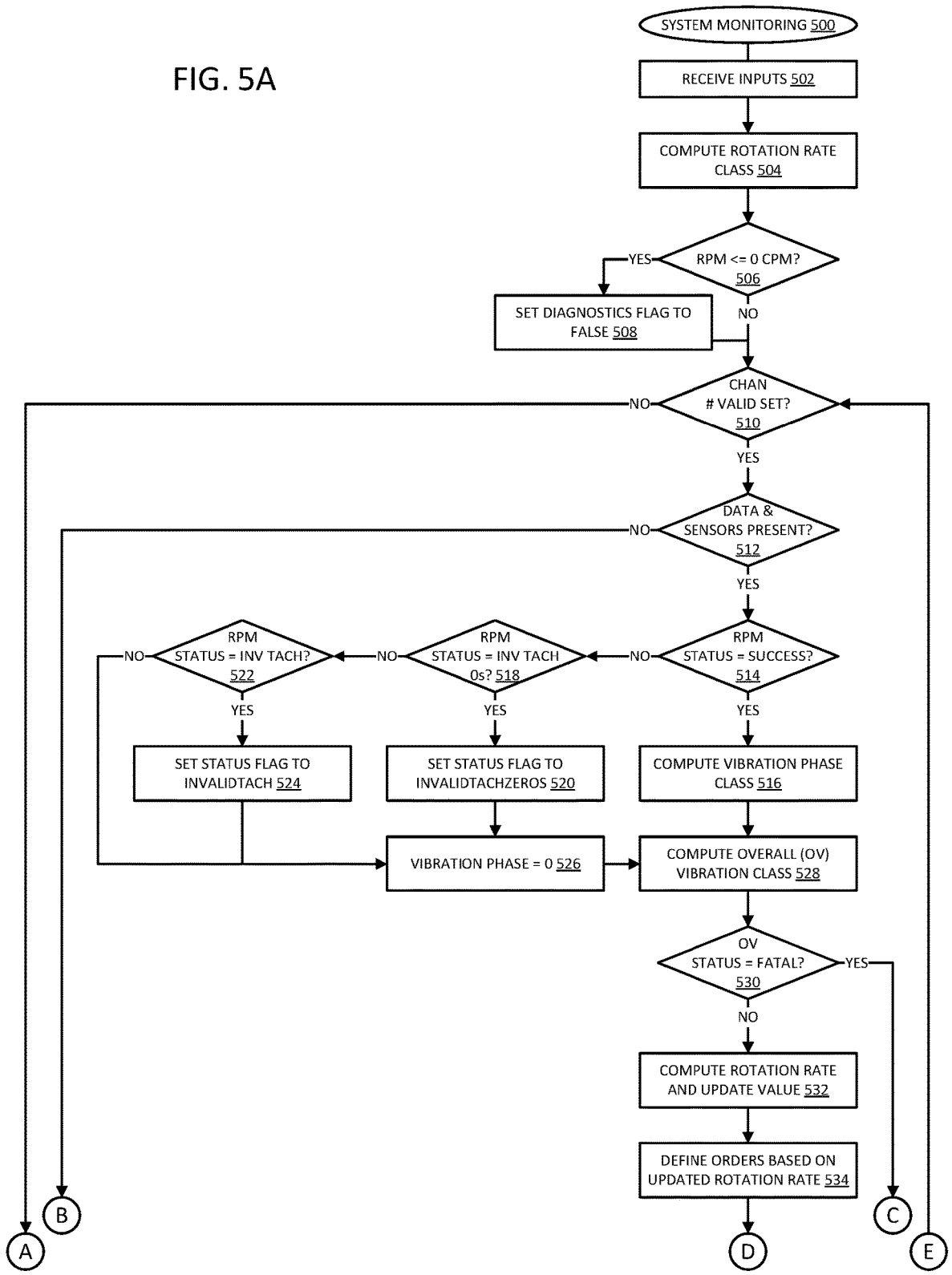
FIGS. 5A-5B are a flow diagram of an embodiment of a process for monitoring a mechanical system with an edge device.
Figure 5B:
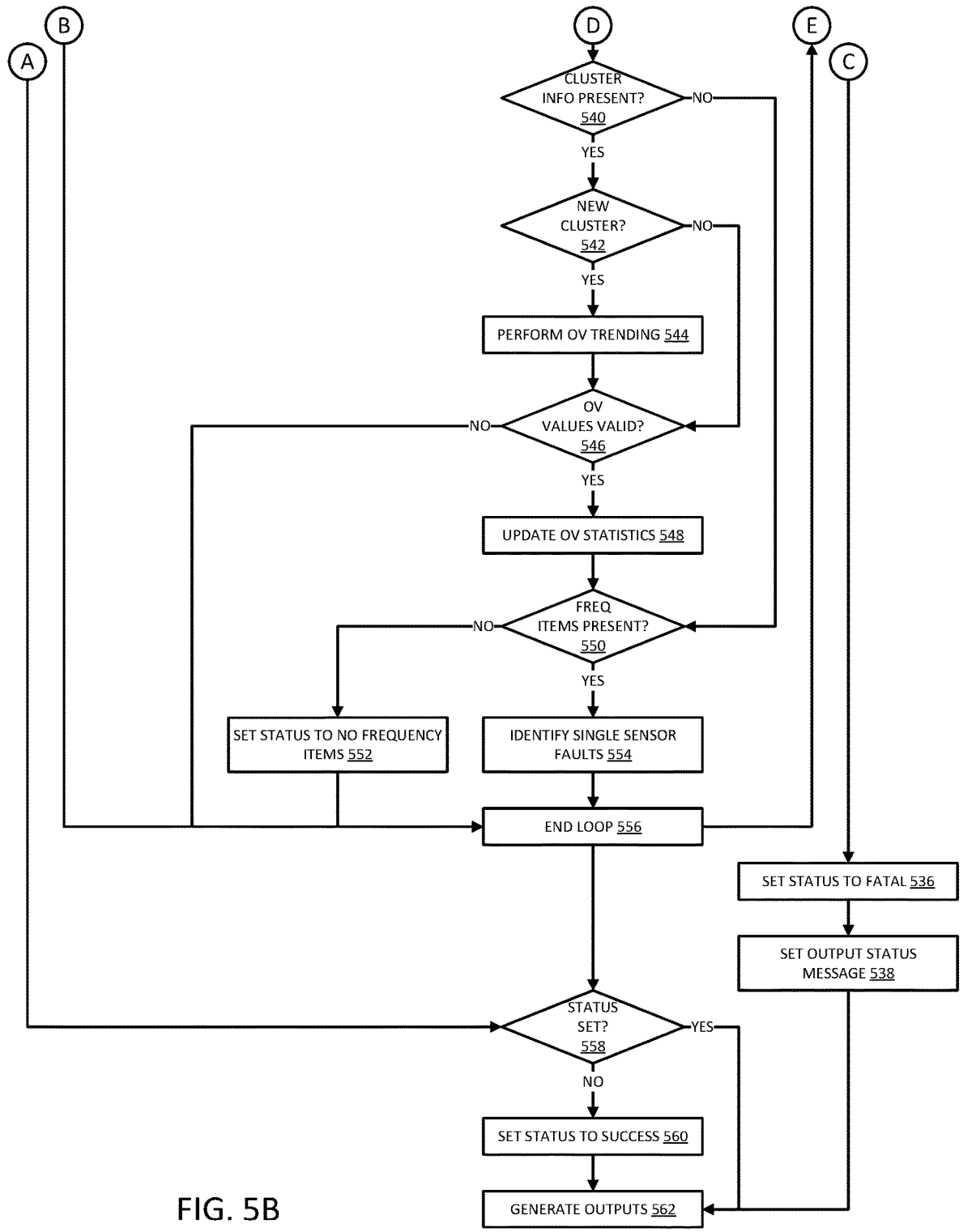

FIGS. 5A-5B are a flow diagram of an embodiment of a process for monitoring a mechanical system with an edge device. Process 500 for monitoring a mechanical system spans FIGS. 5A and 5B. Process 500 is one non-limiting example of how the monitoring can be implemented.

An edge device initializes for monitoring a system, 502. In one embodiment, the edge device computes a rotation rate class for the monitored system based on the received sensor inputs, 504. In one embodiment, the edge device computes a rotation rate class based on the input sensor data, 504. The rotation rate class can refer to a state for the system, such as high or low speed rotation.

In one embodiment, if the rotations per minute are less than or equal to zero cycles per minute, 506 YES branch, the edge device can set a diagnostic flag to false, 508. If the RPM is not less than or equal to zero CPM, 506 NO branch, the edge device can determine if there is a sensor input channel number of a valid set, 510, and start a loop in evaluating sensor input data. In one embodiment, if the channel number does not belong to a valid set, 510 NO branch, the edge device jumps to determine if the status of the analysis is set at 558. If the change number belongs to the valid set, 510 YES branch, the edge device can determine if the sensors are present and provide data, 512. If the sensors or data are not present, 512 NO branch, the edge device can end the loop for that sensor at 556.

If the sensor is present on the channel and provides data, 512 YES branch, the edge device can determine if it was successful in classifying the RPM status of the device, 514. If the RPM status is successful, 514 YES branch, in one embodiment, the edge device computes a vibration phase class, 516. In one embodiment, if the RPM status is not a success, 514 NO branch, the edge device determines if the RPM status is an invalid tachometer zeros setting, 518. If the RPM status is an invalid tachometer zeros setting, 518 YES branch, the edge device can set a status flag to "InvalidTachZeros" setting, 520. If the RPM status is not an invalid tachometer zeros, 518 NO branch, in one embodiment the edge device determines if the RPM status is an invalid tachometer value, 522. If the RPM status is an invalid tachometer value, 522 YES branch, the edge device can set the status flag to "InvalidTach" setting, 524.

If the RPM status is not invalid tachometer, 522 NO branch, there is a different RPM status, and the edge device can set the vibration phase to zero, 526. The edge device can also set the vibration phase to zero after settings the status flag to "InvalidTach" or "InvalidTachZeros". After computing a vibration phase or setting the phase to zero and setting a status flag to the appropriate setting, the edge device can compute an overall (OV) vibration class, 528. The overall vibration class refers to an overall vibration state or overall vibration state of the monitored system as indicated by processing sensor input data. The overall vibration class is a computation provided by an edge device in accordance with an embodiment of a system described herein.

In one embodiment, if the edge device determines that the overall status is not a fatal class, 530 NO branch, the edge device computes a rotation rate and updates a rotation rate value, 532. In one embodiment, computation of the rotation rate includes the computation of an FFT. The edge device can define an order based on the updated rotation rate computed, 534, such as commands in response to the computed rotation rate. If the overall status is a fatal class, 530 YES branch, the edge device can set a status to fatal, 536, and set an output status message, 538.

Returning to a branch where the overall status is not a fatal class, after defining orders based on the determined class, 534, in one embodiment where neural computing is used, the edge device can determine if cluster information is present in the machine learning system for the computed overall vibration class, 540. If the cluster information is not present, 540 NO branch, the edge device can determine if a frequency items are present at 550. If the cluster information is present, 540 YES branch, in one embodiment, the edge device determines if the cluster information is a new cluster, 542. If the information represents a new cluster for the neural network, 542 YES branch, in one embodiment, the edge device performs an overall vibration condition trending analysis, 544. The overall vibration trending analysis can determine how the measured state compares with previous data for the system.

Either after performing the trending analysis or if the cluster information does not represent a new cluster, 542 NO branch, the edge device determines if the overall vibration values represent a valid state, 546. In one embodiment, if the overall values are not valid, 546 NO branch, the edge device ends the processing loop at 556. If the overall values are valid, 546 YES branch, the edge device can update the overall vibration class statistics, 548, and determine if frequency items are present, 550.

If there are no frequency items present, 550 NO branch, in one embodiment, the edge device sets a status of no frequency items, 552, and ends the loop, 556. In one embodiment, if there are frequency items present, 550 YES branch, the edge device identifies single sensor faults based on the frequency items, 554. After identifying specific faults, the edge device ends the loop, 556, and can cycle through the loop for other channel numbers in the set of valid channels. When no valid channels are found, 510 NO branch, in one embodiment, the edge device can determine if the processing has resulted in setting a status for the measured vibration state, 558. If there is a status set, 558 YES branch, the edge device can generate outputs in accordance with the status, 562. If there is not status set, 558 NO branch, the edge device can set the status to success, 560, and generate outputs, 562, based on the processing.

Consider an example of a monitored system with edge process as described herein. In one embodiment, such a system could generate data points with a unique identifier for each monitored data point, sensor name, and condition tagging to provide equipment operator input. In one embodiment, the gathering of data by sensors can result in triggering an alarm based on overall vibration level, a count to indicate a number of samples with a similar FFT result, overall vibration state values, a top ranking diagnosis for the measured conditions, a last occurrence when the data was received at the backend server or cloud processor, or a combination.

A traditional analysis based on the data in the preceding paragraph may generate false positives based on the input data. Sensor data can be measured that could indicate values outside of an ideal scenario, but have normal overall vibration level or normal overall vibration state. Thus, where a traditional approach would generate multiple false positives, the edge device that computes overall vibration state of the system can provide more accurate analysis. In one embodiment, the edge device can generate a "warning" recommendation to send with the data to the backend server, instead of multiple indications of sensor data being measured as out of bounds from an expected value. Measuring the overall vibration state therefore reduces the number of false positives.

Process 500 more specifically refers to overall vibration level as part of the criteria for fault diagnosis a monitored system. In one embodiment, the edge device generates a flag with one of four different levels of vibration severity: Normal, Condition of Interest, Warning, and Critical. Such different levels of severity could be computed with default sigma levels of 0.5, 1.0, 1.5, and 2.0 respectively. In one embodiment, if the overall vibration levels of the monitored system are at or above the 'Warning' level, the processing will continue to process to determine what single sensor faults exist. In one embodiment, if the severity is below the 'Warning' level, the edge device terminates the processing is with an unknown diagnostic (which could be labeled 'UKN'). Process 500 can provide machine learning intelligence in an edge monitor device to monitor overall vibration energy of a mechanical system, and reduce the amount of information that must be either gathered or processed by human operators.

Figure 6:
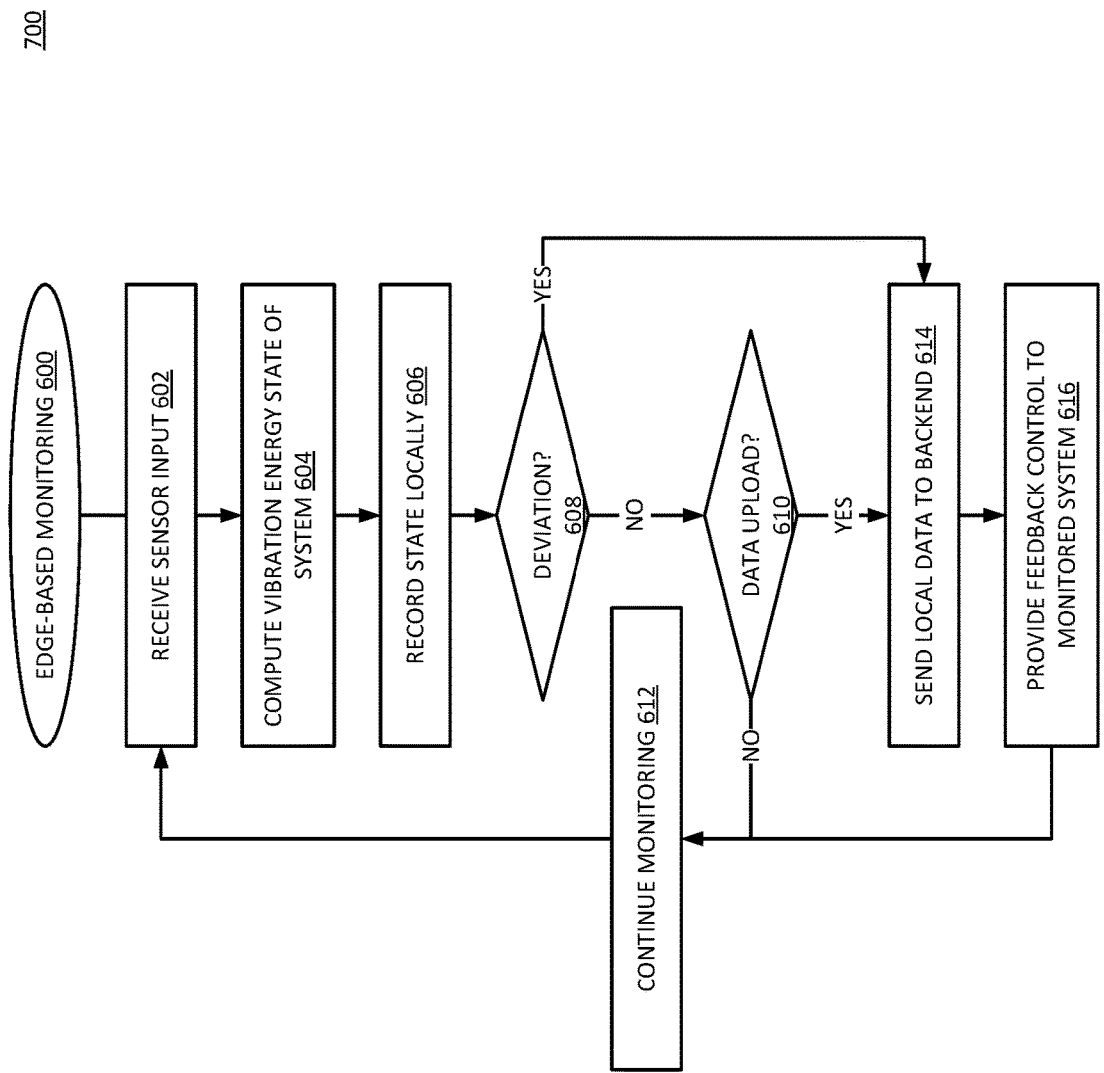
FIG. 6 is a flow diagram of an embodiment of a process for edge-based error monitoring.

FIG. 6 is a flow diagram of an embodiment of a process for edge-based error monitoring. Process 600 illustrates one example of edge-based monitoring of a mechanical system in accordance with an embodiment of an edge device. The edge device receives sensor input from one or multiple sensors, which can include sensors of different types, 602. In one embodiment, the edge device computes a vibration state of the system based on the sensor inputs, 604. The computation of the vibration state can include the execution of FFT processing. In one embodiment, the vibration state is a vibration state. The vibration state refers to an overall state of the system being monitored.

In one embodiment, the edge device records the vibration state locally, 606, and determines if the vibration state deviates from an expected vibration state, 608. In one embodiment, the deviation refers to a classification of a vibration state based on a number of standard deviations away from a reference state. Each standard deviation or portion of a standard deviation can be a different vibration state class to be reported. If the measured vibration state deviates from the expected vibration state, 608 YES branch, the edge device sends the local data to a backend system over a network for diagnostic processing, 614. In one embodiment, the deviation must be more than a threshold to trigger sending the data to the backend. For example, certain vibration states or classes may not trigger an alert to the backend, while certain deviations of overall vibration state may indicate an increased likelihood of failure.

If the vibration state does not deviate by more than a threshold, 608 NO branch, the edge device can determine if there is a scheduling or timing indication to perform a data upload to the backend. In one embodiment, if a data upload is indicated, 610 YES branch, the edge device sends the local data to a backend system for recording and possible diagnostic processing, 614. In one embodiment, data sent to the backend for a deviation and data sent based on scheduling will include the same data, with different flags or classifications. In one embodiment, data sent based on scheduling is recorded and flagged as normal or expected, while data sent based on deviation can include a recommendation for review. For example, in one embodiment, when a deviation occurs, the edge processing includes detecting from individual sensor data what is the likely cause of the failed vibration state.

If the vibration state does not deviate by more than the threshold, and a data upload is not indicated, 610 NO branch, the edge device can continue monitoring the system, 612. In one embodiment, some or all of the data is dumped when it is not to be sent to the backend. Continued monitoring returns to the receipt of sensor data at 602. When data is sent to the backend, 614, in one embodiment, the edge device can additionally provide feedback control to the monitored system, 616. Feedback control can be in the form of setting controls to adjust a setting or rotation speed of the monitored system. In one embodiment, the feedback control can be control in response to a control signal received at the edge device from the backend. The edge device can then continue to monitor, 612.

Figure 7:
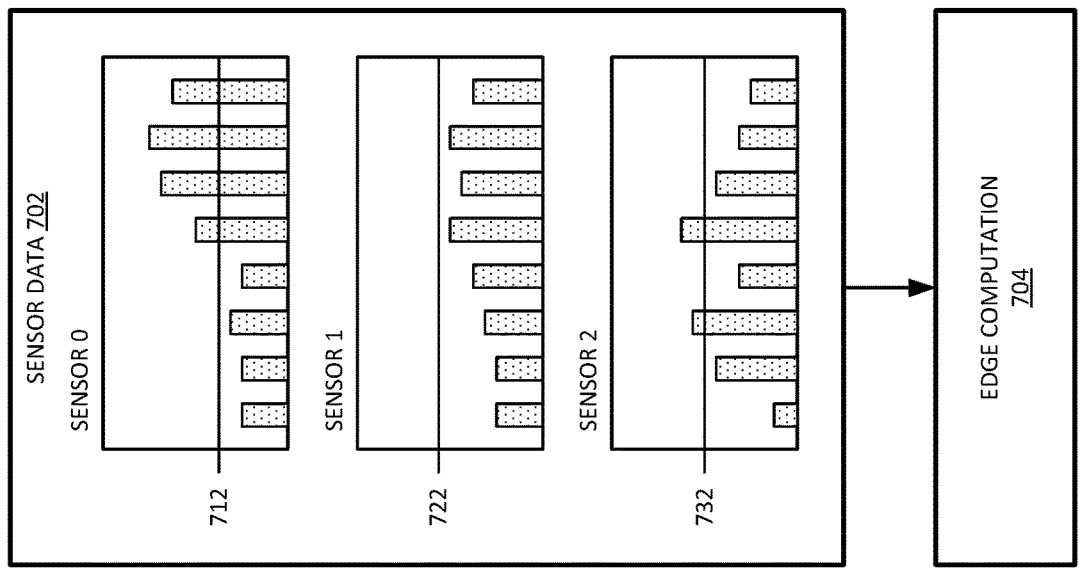
FIG. 7 is a block diagram of an embodiment of edge computation based on multiple sensor inputs.

FIG. 7 is a block diagram of an embodiment of edge computation based on multiple sensor inputs. System 700 represents sensor data from sensors that monitor a mechanical system, and edge computation of the sensor data. Sensor data 702 represents data from different sensors, Sensor0, Sensor1, and Sensor2. Other sensors can be included, and system 700 is merely an example for purposes of illustration. The sensor data is not necessarily representative of real sensor data.

Sensor data 702 illustrates bar graphs to represent sensor data for Sensor0, Sensor1, and Sensor2. The bars represent an amount of data as measured by the sensor, which can be passed to the edge device for processing. In one embodiment, an edge device merely samples one measurement unit from the sensors. In one embodiment, as illustrated, a sampling of data can include multiple samples of data over a time period. The data shown can represent data that has been processed, such as represented as a value based on digital signal processing. For each sensor, there may be a level the processed data is expected to be below, illustrated as levels 712 for Sensor0, level 722 for Sensor1, and level 732 for Sensor2. The specifics of the levels and the data is arbitrary for this example, but it will be understood that different sensors may have different expected levels. Additionally, it will be understood that different sensors can gather data differently, which may cause spikes of varying degrees to occur differently over time for different sensors.

In one embodiment, edge computation 704 receives sensor data 702 and determines an overall vibration state based on the sensor data. Assume for the example that sensor data above the expected levels might indicate data outside of the bounds of what is expected for that particular sensor. Traditionally, data for both Sensor0 and Sensor2 might trigger an alert if the data passes expected levels 712 and 732, respectively, as shown. However, edge computation 704 may determine an overall vibration state from the sensor data and determine that despite energy levels being high for specific sensors, the overall system vibration state does not deviate from an expected state by more than a threshold, and thus would not trigger an alert.

If sensor data 702 does represent an overall vibration state that deviates from a threshold by more than a configured amount, edge computation 704 can trigger a deviation state and send the data to a backend for further processing. In one embodiment, when edge computation 704 detects an overall vibration state that deviates, it may flag specific sensor data, such as the data of Sensor0 for review at the backend. While Sensor2 also has some deviation, edge computation 704 may determine that the data for Sensor2 does not need to be flagged even if the overall vibration state triggers an alert.

Thus, it will be understood that the edge device has flexibility to compute and determine an overall system level to send to the backend. The specific levels of interest will be different for every system, and can be determined by training and historical information. The edge device will be programmed or configured based on the specific information for the specific mechanical system being monitored, and the specific sensors measuring the data.

Figure 8:
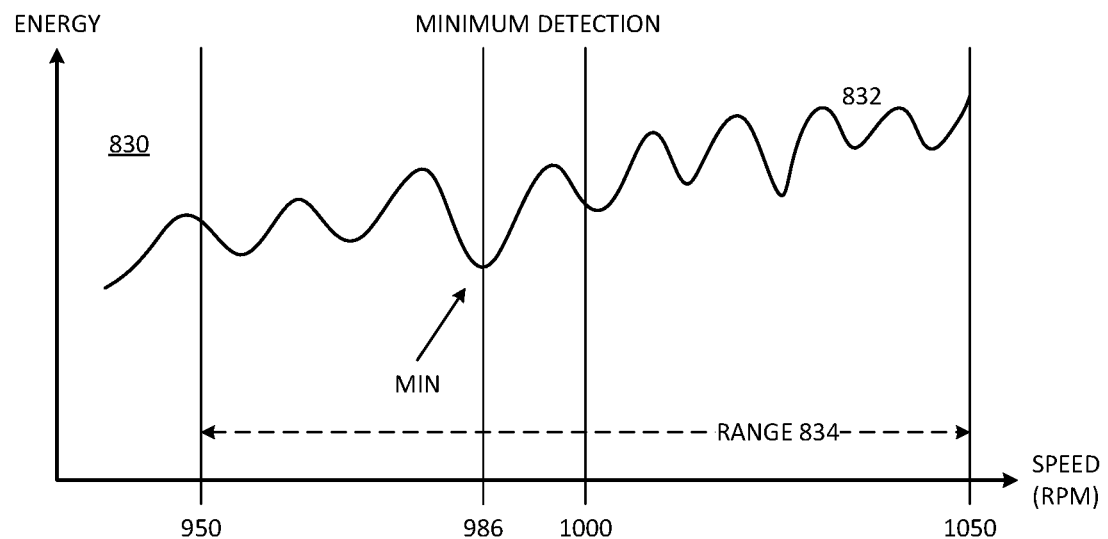
FIG. 8 is a block diagram of an embodiment of local minimum detection in a mechanical monitoring system.
Figure 8:
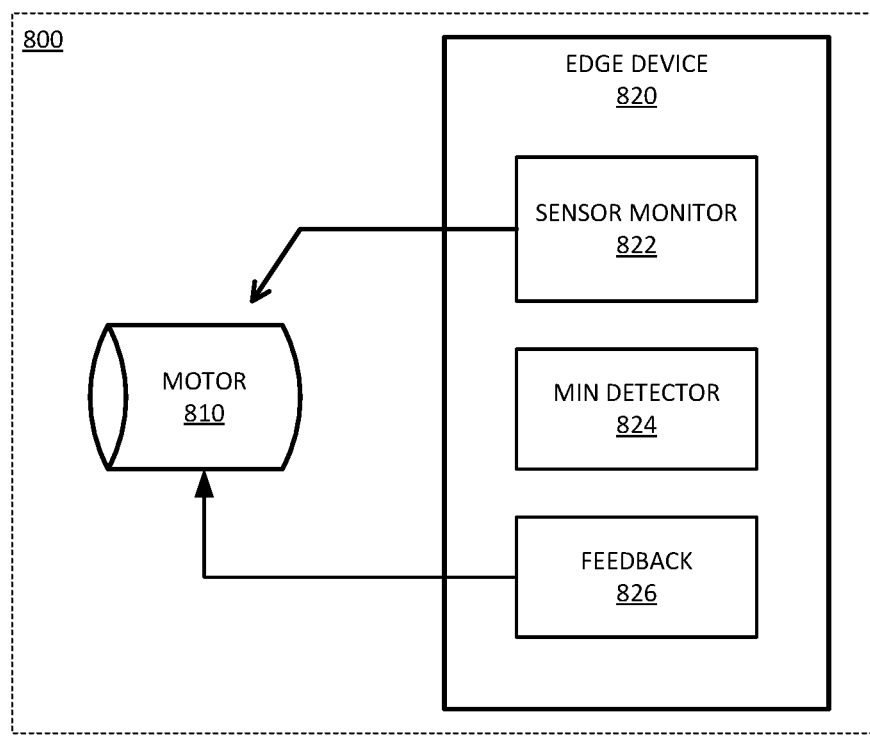

FIG. 8 is a block diagram of an embodiment of local minimum detection in a mechanical monitoring system. System 800 includes motor 810 and edge device 820. System 800 provides one example of a system in accordance with system 200 of FIG. 2. Edge device 820 can provide mechanical monitoring in accordance with any embodiment described herein. In one embodiment, edge device 820 also detects a noise minimum within an operational range for motor 810.

For operation, system 800 can turn motor 810 on, and ramp up its frequency or its rotational speed. Referring to diagram 830, curve 832 provides a simplified representation of a noise response for motor 810 over range 834. Range 834 represents a range of operation within the tolerance of motor 810. For example, assume for diagram 830 that motor operates nominally at 1000 RPM (rotations per minute), with 10% tolerance. Thus, motor 810 may operate anywhere within 950 RPM and 1050 RPM. Curve 832 has peaks and valleys to represent higher and lower points of energy in the noise level. Curve 832 is not necessarily representative of a real system, and is meant to provide an example of higher and lower energy points with a local minimum.

Although motor 810 can operate anywhere within range 834, assume that at 986 RPM there is a local minimum for motor 810. The local minimum represents a lowest total energy point within operational range 834. While not specifically shown, system 800 includes sensors to monitor motor 810, and edge device 820 includes a sensor monitor 822 to gather the sensor data. In one embodiment, edge device 820 includes minimum (min) detector 824. In one embodiment, detector 824 monitors overall energy of motor 810 and identifies the local minimum at 986 RPM. For example, detector 824 can save a setting with a low energy point, and then replace the setting with a new setting that is determined to result in a lower energy point until the local minimum will be identified. While referred to as overall energy, in one embodiment, curve 832 represents energy level of acoustic noise, and thus, the local minimum represents a point of lowest acoustic noise, or the "quietest" point of operation within range 834.

Based on the detected minimum, edge device 820 can provide feedback to motor 810 with feedback logic 826. Feedback logic 826 can include a mechanism to set one or more settings of motor 810 to achieve operation at 986 RPM. In one embodiment, feedback logic 826 provides the settings, and motor 810 includes a controller to implement the settings.

Figure 9:
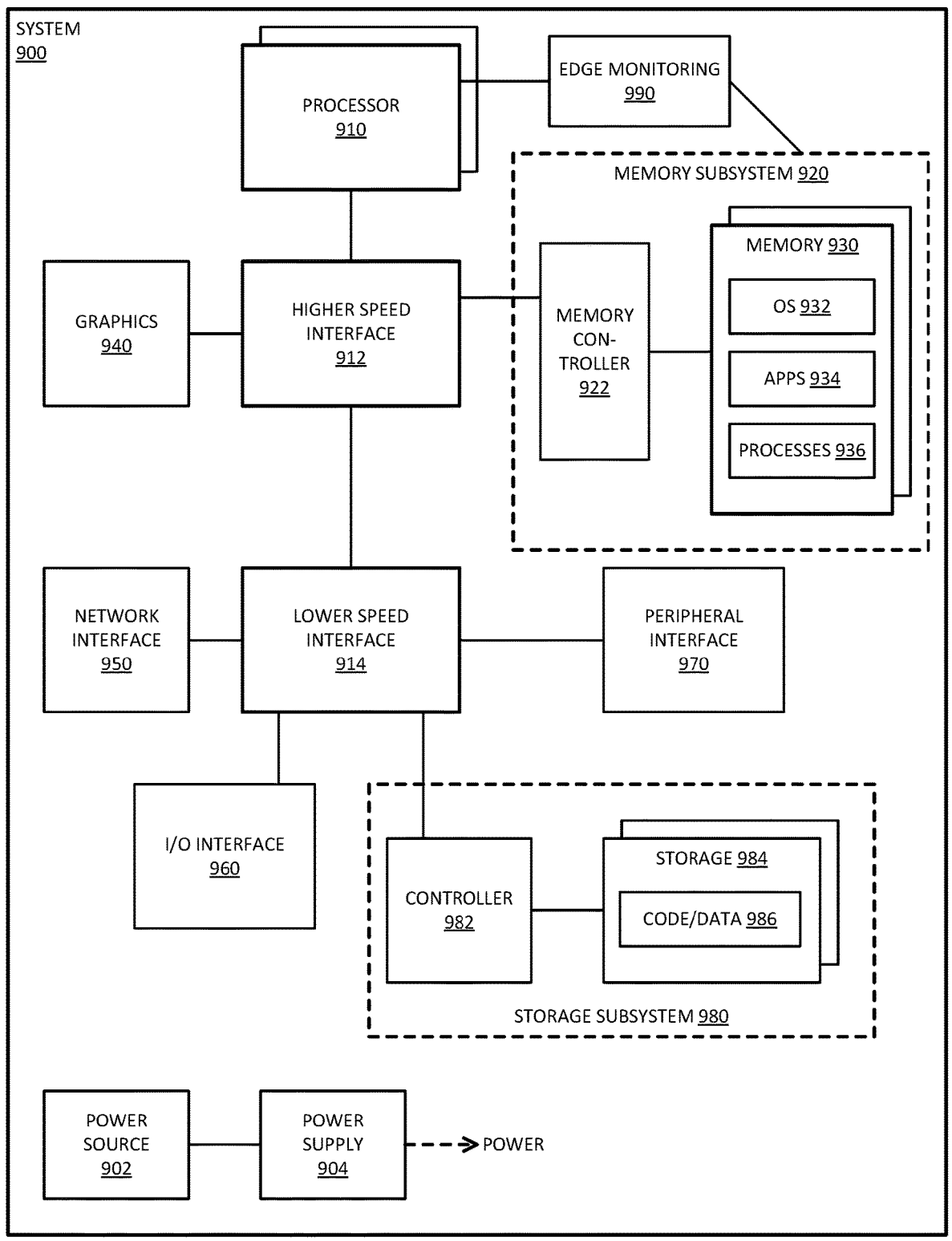
FIG. 9 is a block diagram of an embodiment of a computing system for mechanical system monitoring.

FIG. 9 is a block diagram of an embodiment of a computing system for mechanical system monitoring. System 900 represents a computing device in accordance with any embodiment described herein, and can be a node in a network of nodes. System 900 can thus represent a blade server, or a computation node of a blade (in an implementation where a blade includes multiple nodes), or a storage server, or other computational node. System 900 includes memory resources as described in more detail below.

System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 900 includes interface 912 coupled to processor 910, which can represent a higher speed interface or a high throughput interface for system components that needs higher bandwidth connections, such as memory subsystem 920 or graphics interface components 940. Interface 912 can represent a "north bridge" circuit, which can be a standalone component or integrated onto a processor die. Graphics interface 940 interfaces to graphics components for providing a visual display to a user of system 900. In one embodiment, graphics interface 940 generates a display based on data stored in memory 930 or based on operations executed by processor 910 or both.

Memory subsystem 920 represents the main memory of system 900, and provides storage for code to be executed by processor 910, or data values to be used in executing a routine. Memory subsystem 920 can include one or more memory devices 930 such as read-only memory (ROM), flash memory, one or more varieties of random access memory (RAM), or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide logic to provide functions for system 900. In one embodiment, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one embodiment, system 900 includes interface 914, which can be coupled to interface 912. Interface 914 can be a lower speed interface than interface 912. In one embodiment, interface 914 represents an interface circuit, which can include standalone components and integrated circuitry. In one embodiment, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, USB (universal serial bus), or other wired or wireless standards-based or proprietary interfaces. Network interface 950 can exchange data with a remote device, which can include sending data stored in memory or receiving data to be stored in memory.

In one embodiment, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one embodiment, system 900 includes storage subsystem 980 to store data in a nonvolatile manner. In one embodiment, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (i.e., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (i.e., the value or state of the data is indeterminate if power is interrupted to system 900). In one embodiment, storage subsystem 980 includes controller 982 to interface with storage 984. In one embodiment controller 982 is a physical part of interface 914 or processor 910, or can include circuits or logic in both processor 910 and interface 914.

Power source 902 provides power to the components of system 900. More specifically, power source 902 typically interfaces to one or multiple power supplies 904 in system 902 to provide power to the components of system 900. In one embodiment, power supply 904 includes an AC to DC (alternating current to direct current) adapter to plug into a wall outlet. Such AC power can be renewable energy (e.g., solar power) power source 902. In one embodiment, power source 902 includes a DC power source, such as an external AC to DC converter. In one embodiment, power source 902 or power supply 904 includes wireless charging hardware to charge via proximity to a charging field. In one embodiment, power source 902 can include an internal battery or fuel cell source.

System 900 can represent an edge device in accordance with any embodiment described herein. Edge monitor 990 represents the services for performing edge monitoring in accordance with what is described herein. The edge monitoring can include the performing of computations and making determinations about whether an overall vibration state of a monitored system indicates deviations from an expected state. In one embodiment, edge monitoring 990 monitors to determine if a rotation speed of a monitored system can be set to reduce the overall vibration state while still working within the range of rotation speeds of the operation. Varying the speed can adjust for harmonics or vibrations in the system that could otherwise lead to higher noise or accelerate failure of the system. Edge monitoring 990 can include processes and services executed by processor 910 with code and data in memory subsystem 920. In one embodiment, the system can provide feedback to set the operation of the monitored mechanical system at a rotation speed that results in a lowest local vibration state. In one embodiment, in addition to or in place of vibration energy, the system can monitor acoustic energy. Any description relative to vibration energy can thus be understood in one embodiment to apply to the monitoring and responding to acoustic energy.

Figure 10:
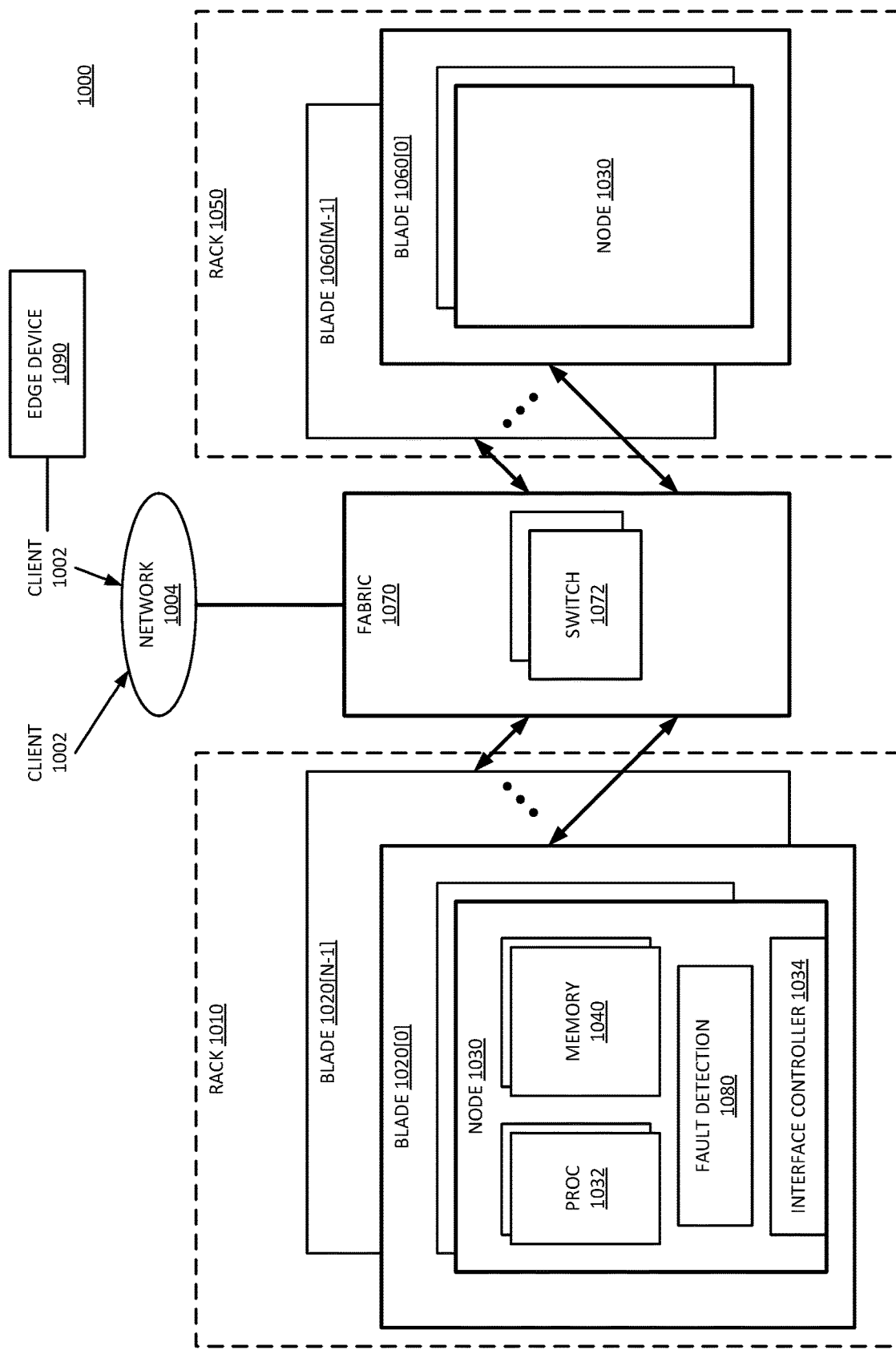
FIG. 10 is a block diagram of an embodiment of a multi-node network in which mechanical system monitoring processing can be implemented.

FIG. 10 is a block diagram of an embodiment of a multi-node network in which mechanical system monitoring processing can be implemented. System 1000 represents a cloud server or a backend server in accordance with any embodiment described herein. In one embodiment, system 1000 represents a data center. In one embodiment, system 1000 represents a server farm. In one embodiment, system 1000 represents a data cloud or a processing cloud.

One or more clients 1002 make requests over network 1004 to system 1000. Network 1004 represents one or more local networks, or wide area networks, or a combination. Clients 1002 can be human or machine clients, which generate requests for the execution of operations by system 1000. System 1000 executes applications or data computation tasks requested by clients 1002.

In one embodiment, edge device 1090 is a client 1002. As a client, edge device 1090 may access processing services of the backend server. Edge device 1000 can be an edge device in accordance with any embodiment described herein. Edge device 1000 can provide data for diagnostic processing to the backend server in accordance with any embodiment described herein.

In one embodiment, system 1000 includes one or more racks, which represent structural and interconnect resources to house and interconnect multiple computation nodes. In one embodiment, rack 1010 includes multiple nodes 1030. In one embodiment, rack 1010 hosts multiple blade components 1020. Hosting refers to providing power, structural or mechanical support, and interconnection. Blades 1020 can refer to computing resources on printed circuit boards (PCBs), where a PCB houses the hardware components for one or more nodes 1030. In one embodiment, blades 1020 do not include a chassis or housing or other "box" other than that provided by rack 1010. In one embodiment, blades 1020 include housing with exposed connector to connect into rack 1010. In one embodiment, system 1000 does not include rack 1010, and each blade 1020 includes a chassis or housing that can stack or otherwise reside in close proximity to other blades and allow interconnection of nodes 1030.

System 1000 includes fabric 1070, which represents one or more interconnectors for nodes 1030. In one embodiment, fabric 1070 includes multiple switches 1072 or routers or other hardware to route signals among nodes 1030. Additionally, fabric 1070 can couple system 1000 to network 1004 for access by clients 1002. In addition to routing equipment, fabric 1070 can be considered to include the cables or ports or other hardware equipment to couples nodes 1030 together. In one embodiment, fabric 1070 has one or more associated protocols to manage the routing of signals through system 1000. In one embodiment, the protocol or protocols is at least partly dependent on the hardware equipment used in system 1000.

As illustrated, rack 1010 includes N blades 1020. In one embodiment, in addition to rack 1010, system 1000 includes rack 1050. As illustrated, rack 1050 includes M blades 1060. M is not necessarily the same as N; thus, it will be understood that various different hardware equipment components could be used, and coupled together into system 1000 over fabric 1070. Blades 1060 can be the same or similar to blades 1020. Nodes 1030 can be any type of node as described herein, and are not necessarily all the same type of node. System 1000 is not limited to being homogenous, nor is it limited to not being homogenous.

For simplicity, only the node in blade 1020[0] is illustrated in detail. However, other nodes in system 1000 can be the same or similar. At least some nodes 1030 are computation nodes, with processor 1032 and memory 1040. A computation node refers to a node with processing resources (e.g., one or more processors) that executes an operating system and can receive and process one or more tasks. In one embodiment, at least some nodes 1030 are storage server nodes with a server as processing resources 1032 and memory 1040. A storage server refers to a node with more storage resources than a computation node, and rather than having processors for the execution of tasks, a storage server includes processing resources to manage access to the storage nodes within the storage server.

In one embodiment, node 1030 includes interface controller 1034, which represents logic to control access by node 1030 to fabric 1070. The logic can include hardware resources to interconnect to the physical interconnection hardware. The logic can include software or firmware logic to manage the interconnection. In one embodiment, interface controller 1034 is or includes a host fabric interface (HFI). Node 1030 includes memory subsystem 1040, which provides storage services for data to be computed by processors 1032. Processor 1032 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1040 can be or include memory devices and a memory controller.

Edge device 1090 performs edge monitoring, which can include the performing of computations and making determinations about whether an overall vibration state of a monitored system indicates deviations from an expected state. In one embodiment, edge device 1090 monitors to determine if a rotation speed of a monitored system can be set to reduce the overall vibration state while still working within the range of rotation speeds of the operation. Varying the speed can adjust for harmonics or vibrations in the system that could otherwise lead to higher noise or accelerate failure of the system. In one embodiment, the system can provide feedback to set the operation of the monitored mechanical system at a rotation speed that results in a lowest local vibration state.

In one embodiment, node 1030 includes fault detection 1080. Fault detection 1080 enables diagnostic processing of data provided by edge device 1090. Fault detection 1080 represents services that can be executed with the processing and memory resources of node 1030. In one embodiment, fault detection 1080 processes recommendations and alerts provided by edge device 1090. Fault detection 1080 enables backend processing to determine if a vibration state deviation detected by edge device 1090 should result in remedial action or further review of the system being monitored.

In one aspect, an apparatus for monitoring a mechanical system includes: a hardware interface to receive sensor data to monitor a motor; a processor to compute a vibration state of the motor based on the sensor data, and to determine when the vibration state differs from a reference by more than a threshold; and a network interface to couple to a server, to send the sensor data to the server for diagnostic processing when the vibration state differs from the reference by more than the threshold, and otherwise to not send the sensor data to the server.

In one embodiment, the sensor data comprises data from multiple sensors to monitor a pre-failure condition of the motor. In one embodiment, the multiple sensors comprise multiple different types of sensors. In one embodiment, the multiple different types of sensors comprise sensors configured to monitor motor heat, axle motion deviation, motor acoustics, or a combination. In one embodiment, the energy is to indicate a condition of a rolling bearing that supports an axial load during rotation of an axle of the motor. In one embodiment, the vibration state is to indicate a pre-failure condition of an overall vibration level of the motor. In one embodiment, the processor is to execute machine learning system or a neural network. In one embodiment, the network interface is to send the sensor data to the server when the vibration state exceeds a baseline energy level based on previous monitoring of the motor. In one embodiment, further comprising the network interface to periodically send the sensor data when the vibration state does not differ from the reference by more than the threshold for a period of time. In one embodiment, further comprising control logic to selectively adjust a motor setting in response to the vibration state.

In one aspect, a system for monitoring a mechanical device includes: a sensor to generate sensor data based on measurement of an environmental condition of a mechanical device with a rolling bearing; an edge processing device on a same side of a network connection as the sensor to compute a vibration state of the rolling bearing based on the sensor data, and to determine when the vibration state differs from a reference by more than a threshold; and to send the sensor data to a server on a remote side of the network connection for diagnostic processing when the vibration state differs from the reference by more than the threshold, and otherwise to not send the sensor data to the server.

In one embodiment, the sensor is to monitor a pre-failure condition of the mechanical device. In one embodiment, further comprising one or more additional sensors to have multiple sensors to generate sensor data. In one embodiment, the multiple sensors comprise multiple different types of sensors. In one embodiment, the multiple different types of sensors comprise sensors configured to monitor motor heat, axle motion deviation, motor acoustics, or a combination. In one embodiment, the rolling bearing comprises a bearing that supports an axial load during rotation of an axle of a motor of the mechanical device. In one embodiment, the vibration state is to indicate a pre-failure condition of an overall vibration level of the rolling bearing. In one embodiment, the edge processing device is to execute a machine learning system or neural network. In one embodiment, the edge processing device is to send the sensor data to the server when the vibration state deviates from a historical energy level based on previous monitoring of the rolling bearing. In one embodiment, further comprising the edge processing device to periodically send the sensor data when the vibration state does not differ from the reference by more than the threshold for a period of time. In one embodiment, the edge processing device further comprising control logic to adjust a motor setting of a motor coupled to the rolling bearing in response to the vibration state.

In one aspect, a method for monitoring a mechanical system includes: receiving sensor data from a sensor device that monitors a mechanical system with a rolling bearing; determining, based on the sensor data, whether a vibration state of the mechanical system deviates from a reference by more than a threshold; and sending the sensor data to a server for diagnostic processing when the vibration state deviates from the reference by more than the threshold, and otherwise, not sending the sensor data to the server.

In one embodiment, further comprising: sending the sensor data to a server for diagnostic processing when the vibration state deviates from the reference by more than the threshold, or sending the sensor data to the server for recording when the vibration state does not deviate from the reference by more than the threshold, but at least a period of time has passed since a previous sending of the sensor data, and otherwise, not sending the sensor data to the server. In one embodiment, receiving the sensor data comprises receiving data from multiple sensors that monitor a pre-failure condition of the motor. In one embodiment, the multiple sensors comprise multiple different types of sensors. In one embodiment, the multiple different types of sensors comprise sensors configured to monitor motor heat, axle motion deviation, motor acoustics, or a combination. In one embodiment, determining the vibration state comprises determining a condition of a rolling bearing that supports an axial load during rotation of an axle of a motor of the mechanical system. In one embodiment, determining the vibration state comprises determining a pre-failure condition of an overall vibration level of the motor. In one embodiment, determining the vibration state comprises determining the vibration state with a machine learning system or a neural network prior to sending the sensor data to the server. In one embodiment, further comprising selectively adjusting a motor setting in response to the vibration state.

In one aspect, an apparatus comprising means for performing operations to execute a method for monitoring a mechanical system in accordance with any embodiment of the preceding two paragraphs. In one aspect, an article of manufacture comprising a computer readable storage medium having contents stored thereon, which when accessed by a machine provide instructions to perform operations to execute a method for monitoring a mechanical system in accordance with any embodiment of the preceding two paragraphs.

In one aspect, an apparatus for monitoring a mechanical system includes: a hardware interface to receive sensor data to monitor a rotating mechanical system; a processor to compute a vibration state of the rotating mechanical system based on the sensor data, and a lowest vibration state within an operational range of the rotating mechanical system; and control logic to selectively adjust a rotating mechanical system setting to operate the rotating mechanical system at the detected lowest vibration state.

In one embodiment, the sensor data comprises data from multiple sensors to monitor a pre-failure condition of the rotating mechanical system. In one embodiment, the multiple sensors comprise multiple different types of sensors. In one embodiment, the multiple different types of sensors comprise sensors configured to monitor rotating mechanical system heat, rotating mechanical system rotation speed, axle motion deviation, rotating mechanical system acoustics, or a combination. In one embodiment, the vibration state of the rotating mechanical system comprises an acoustic noise level. In one embodiment, the processor is to execute a machine learning system. In one embodiment, selectively adjust the rotating mechanical system setting comprises setting operation of the rotating mechanical system to a rotation speed to result in a minimum vibration state within an operational tolerance of the rotating mechanical system. In one embodiment, the rotating mechanical system comprises a motor.

In one aspect, a system for monitoring a mechanical system includes: a sensor to generate sensor data to about a vibration energy of a mechanical system; and an edge monitoring device to receive the sensor data to monitor the rotating mechanical system, compute a vibration state of the rotating mechanical system based on the sensor data, and a lowest vibration state within an operational range of the rotating mechanical system; wherein the edge monitoring device is to provide feedback to selectively adjust a setting for the rotating mechanical system to operate the rotating mechanical system at the detected lowest vibration state.

In one embodiment, the sensor data comprises data from multiple sensors to monitor a pre-failure condition of the rotating mechanical system. In one embodiment, the multiple sensors comprise multiple different types of sensors. In one embodiment, the multiple different types of sensors comprise sensors configured to monitor rotating mechanical system heat, rotating mechanical system rotation speed, axle motion deviation, rotating mechanical system acoustics, or a combination. In one embodiment, the vibration state of the rotating mechanical system comprises an acoustic noise level. In one embodiment, the processor is to execute a machine learning system. In one embodiment, selectively adjust the rotating mechanical system setting comprises setting operation of the rotating mechanical system to a rotation speed to result in a minimum vibration state within an operational tolerance of the rotating mechanical system. In one embodiment, the rotating mechanical system comprises a motor.

In one aspect, an apparatus for monitoring a mechanical system includes: a hardware interface to receive sensor data to monitor a rotating mechanical system, including tachometer data to indicate a rotation rate of the rotating mechanical device; a processor to compute a vibration state of the rotating mechanical system based on the sensor data; and a network interface to couple to a server, to send the sensor data to the server for diagnostic processing when the vibration state differs from the reference by more than the threshold, and otherwise to not send the sensor data to the server.

In one embodiment, the sensor data comprises data from multiple sensors to monitor a pre-failure condition of the rotating mechanical system. In one embodiment, the multiple sensors comprise multiple different types of sensors. In one embodiment, the multiple different types of sensors comprise sensors configured to monitor rotating mechanical system heat, rotating mechanical system rotation speed, axle motion deviation, rotating mechanical system acoustics, or a combination. In one embodiment, the vibration state of the rotating mechanical system comprises an acoustic noise level. In one embodiment, the energy is to indicate a condition of a rolling bearing that supports an axial load during rotation of an axle of the motor. In one embodiment, the energy state is to indicate a pre-failure condition of an overall vibration level of the motor. In one embodiment, the processor is to execute a machine learning system. In one embodiment, selectively adjust the rotating mechanical system setting comprises setting operation of the rotating mechanical system to a rotation speed to result in a minimum vibration state within an operational tolerance of the rotating mechanical system. In one embodiment, the network interface is to send the sensor data to the server when the energy state exceeds a baseline energy level based on previous monitoring of the motor. In one embodiment, further comprising the network interface to periodically send the sensor data when the energy state does not differ from the reference by more than the threshold for a period of time. In one embodiment, further comprising control logic to selectively adjust a motor setting in response to the energy state. In one embodiment, the rotating mechanical system comprises a motor.

In one aspect, a system for monitoring a mechanical device includes: a sensor to generate sensor data based on measurement of an environmental condition of a mechanical device, including a tachometer to measure a rotation rate of the mechanical device; an edge processing device on a same side of a network connection as the sensor to compute a vibration state of the mechanical device based on the sensor data, and to determine when the vibration state differs from a reference by more than a threshold; and to send the sensor data to a server on a remote side of the network connection for diagnostic processing when the vibration state differs from the reference by more than the threshold, and otherwise to not send the sensor data to the server.

In one embodiment, further comprising one or more additional sensors of multiple different types of sensors. In one embodiment, the vibration state is to indicate a pre-failure condition of an overall vibration level of the mechanical device. In one embodiment, the edge processing device is to execute a machine learning system. In one embodiment, the edge processing device is to send the sensor data to the server when the vibration state deviates from a historical energy level based on previous monitoring of the mechanical device. In one embodiment, further comprising the edge processing device to periodically send the sensor data when the vibration state does not differ from the reference by more than the threshold for a period of time. In one embodiment, the edge processing device further comprising control logic to adjust a motor setting of a motor coupled to the mechanical device in response to the vibration state. In one embodiment, the edge processing device is to set an operation of the motor to a rotation speed to result in a minimum vibration state within an operational range of the mechanical device. In one embodiment, the edge processing device is to set an operation of the motor to a rotation speed to result in a minimum acoustic noise within an operational range of the mechanical device.

In one aspect, a method for monitoring a mechanical system includes: receiving sensor data from a sensor device that monitors a mechanical system; determining, based on the sensor data, whether an overall vibration state of the mechanical system deviates from a reference by more than a threshold; and sending the sensor data to a server for diagnostic processing when the vibration state deviates from the reference by more than the threshold, and otherwise, not sending the sensor data to the server.

In one embodiment, further comprising: sending the sensor data to a server for diagnostic processing when the overall vibration state deviates from the reference by more than the threshold, or sending the sensor data to the server for recording when the overall vibration state does not deviate from the reference by more than the threshold, but at least a period of time has passed since a previous sending of the sensor data, and otherwise, not sending the sensor data to the server.

In one embodiment, further comprising: adjusting a motor setting of a motor coupled to the mechanical system in response to the overall vibration state. In one embodiment, adjusting the motor setting comprises setting an operation of the motor to a rotation speed to result in a minimum acoustic noise within an operational tolerance for the motor.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A system for monitoring a mechanical device, comprising:
    a sensor to generate sensor data based on measurement of an environmental condition of a mechanical device, including a tachometer to measure a rotation rate of the mechanical device; and
    an edge processing device on a same side of a network connection as the sensor to compute a vibration state of the mechanical device based on the sensor data, and to determine when the vibration state differs from a reference by more than a threshold; and to send the sensor data to a server on a remote side of the network connection for diagnostic processing when the vibration state differs from the reference by more than the threshold and when the vibration state differs from a historical energy level based on previous monitoring of the mechanical device, and otherwise to not send the sensor data to the server.

2. The system of claim 1, further comprising one or more additional sensors of multiple different types of sensors.

3. The system of claim 1, wherein the vibration state is to indicate a pre-failure condition of an overall vibration level of the mechanical device.

4. The system of claim 1, wherein the edge processing device is to execute a machine learning system.

5. The system of claim 1, further comprising the edge processing device to periodically send the sensor data when the vibration state does not differ from the reference by more than the threshold for a period of time.

6. The system of claim 1, the edge processing device further comprising control logic to adjust a motor setting of a motor coupled to the mechanical device in response to the vibration state.

7. The system of claim 6, wherein the edge processing device is to set an operation of the motor to a rotation speed to result in a minimum vibration state within an operational range of the mechanical device.

8. The system of claim 6, wherein the edge processing device is to set an operation of the motor to a rotation speed to result in a minimum acoustic noise within an operational range of the mechanical device.

9. A method for monitoring a mechanical system, comprising:
    receiving sensor data from a sensor device that monitors a mechanical system;
    determining, based on the sensor data, whether an overall vibration state of the mechanical system deviates from a reference by more than a threshold; and
    sending the sensor data to a server for diagnostic processing when the vibration state deviates from the reference by more than the threshold and when the vibration state differs from a historical energy level based on previous monitoring of the mechanical system, and otherwise, not sending the sensor data to the server.

10. The method of claim 9, further comprising:
    sending the sensor data to a server for diagnostic processing when the overall vibration state deviates from the reference by more than the threshold and when the vibration state differs from a historical energy level based on previous monitoring of the mechanical system, or
    sending the sensor data to the server for recording when the overall vibration state does not deviate from the reference by more than the threshold, but at least a period of time has passed since a previous sending of the sensor data, and otherwise,
    not sending the sensor data to the server.

11. The method of claim 9, further comprising:
adjusting a motor setting of a motor coupled to the mechanical system in response to the overall vibration state.

12. The method of claim 11, wherein adjusting the motor setting comprises setting an operation of the motor to a rotation speed to result in a minimum acoustic noise within an operational tolerance for the motor.

* * * * *